United States Patent
Leonhardt et al.

(10) Patent No.: US 10,173,355 B2
(45) Date of Patent: Jan. 8, 2019

(54) METHOD FOR PRODUCING A MOLDED PART MADE OF PLASTIC AND PROVIDED WITH A UV-CURED PAINT, AND SAID MOLDED PART

(71) Applicant: Bayer MaterialScience AG, Monheim am Rhein (DE)

(72) Inventors: Konstantin Leonhardt, Grevenbroich (DE); Roland Künzel, Leverkusen (DE); Björn Herdt, Bergisch Gladbach (DE); Hans-Jörg Dahmen, Duisburg (DE); Holger Mundstock, Wermelskirchen (DE); Dirk Pophusen, Bergisch Gladbach (DE)

(73) Assignee: Covestro Deutschland AG, Leverkusen (DE)

(*) Notice: Subject to any disclaimer, the term of this patent is extended or adjusted under 35 U.S.C. 154(b) by 481 days.

(21) Appl. No.: 14/428,485

(22) PCT Filed: Sep. 18, 2013

(86) PCT No.: PCT/EP2013/069331
§ 371 (c)(1),
(2) Date: Mar. 16, 2015

(87) PCT Pub. No.: WO2014/044694
PCT Pub. Date: Mar. 27, 2014

(65) Prior Publication Data
US 2015/0239159 A1    Aug. 27, 2015

(30) Foreign Application Priority Data
Sep. 19, 2012    (EP) .................................... 12185097

(51) Int. Cl.
B29C 45/14    (2006.01)
B44F 7/00    (2006.01)

(52) U.S. Cl.
CPC .......... *B29C 45/14* (2013.01); *B29C 45/1418* (2013.01); *B29C 45/14811* (2013.01);
(Continued)

(58) Field of Classification Search
CPC .......... B29C 45/1418; B29C 45/14688; B29C 45/14811; B29C 2045/1479; B29C 2045/14704
(Continued)

(56) References Cited

U.S. PATENT DOCUMENTS

| 3,692,744 A | 9/1972 | Rich et al. |
| 4,176,224 A | 11/1979 | Bier et al. |

(Continued)

FOREIGN PATENT DOCUMENTS

| DE | 19 00 270 A1 | 11/1969 |
| DE | 2407674 A1 | 10/1974 |

(Continued)

OTHER PUBLICATIONS

International Search Report for PCT/EP2013/069331 dated Oct. 16, 2013.

*Primary Examiner* — Christina A Johnson
*Assistant Examiner* — Xue H Liu
(74) *Attorney, Agent, or Firm* — Drinker Biddle & Reath LLP

(57) ABSTRACT

The invention relates to as method for producing a molded part in an injection mold, which molded part is made of plastic and provided with a UV-cured paint, wherein the UV-cured paint forms a visible surface designed as a functional surface. The invention further relates to such a molded part provided with a UV-cured paint, said molded part having a visible surface designed as a functional surface, wherein the UV-cured paint forms said visible surface.

7 Claims, 8 Drawing Sheets

(52) U.S. Cl.
CPC ...... *B44F 7/00* (2013.01); *B29C 2045/14729* (2013.01); *Y10T 428/24355* (2015.01)

(58) Field of Classification Search
USPC ................................................ 264/259, 266
See application file for complete search history.

(56) References Cited

U.S. PATENT DOCUMENTS

| | | | |
|---|---|---|---|
| 5,126,428 | A | 6/1992 | Freitag et al. |
| 6,809,126 | B2 | 10/2004 | Fäcke et al. |
| 8,053,065 | B2 | 11/2011 | Ortmeier et al. |
| 8,334,052 | B2 | 12/2012 | Gruber et al. |
| 2005/0124714 | A1 | 6/2005 | Weikard et al. |
| 2008/0135171 | A1 | 6/2008 | Gruber et al. |
| 2008/0145624 | A1* | 6/2008 | Weikard .............. B29C 45/1418 428/195.1 |
| 2009/0061215 | A1 | 3/2009 | Baumgart et al. |
| 2009/0269568 | A1* | 10/2009 | Kuhlmann ......... C08G 18/0823 428/220 |
| 2011/0117350 | A1* | 5/2011 | Kunzel ............. B29C 45/14688 428/220 |

FOREIGN PATENT DOCUMENTS

| | | |
|---|---|---|
| DE | 2407776 A1 | 9/1975 |
| DE | 2715932 A1 | 10/1978 |
| DE | 3 316 592 A1 | 11/1984 |
| DE | 3832396 A1 | 2/1990 |
| DE | 4040290 A1 | 7/1992 |
| DE | 102010020039 A1 | 11/2011 |
| EP | 0359953 A1 | 3/1990 |
| EP | 1448735 A2 | 8/2004 |
| EP | 1541649 A1 | 6/2005 |
| EP | 1695808 A1 | 8/2006 |
| EP | 2174765 A2 | 4/2010 |
| FR | 1561518 A | 3/1969 |
| GB | 1229482 A | 4/1971 |
| GB | 1464449 A | 2/1977 |
| WO | WO-2005/080484 A1 | 9/2005 |
| WO | WO-2005/099943 A2 | 10/2005 |
| WO | WO-2005118689 A1 | 12/2005 |
| WO | WO-2006/048109 A1 | 5/2006 |
| WO | WO-2008/052665 A2 | 5/2008 |

* cited by examiner

METHOD FOR PRODUCING A MOLDED PART MADE OF PLASTIC AND PROVIDED WITH A UV-CURED PAINT, AND SAID MOLDED PART

CROSS-REFERENCE TO RELATED APPLICATIONS

This application is a national stage application (under 35 U.S.C. § 371) of PCT/EP2013/069331, filed Sep. 18, 2013, which claims benefit of European Application No. 12185097.8, filed Sep. 19, 2012, both of which are incorporated herein by reference in their entirety.

The invention relates to a process for production, in an injection mold, of a plastics molding provided with a UV-cured lacquer, where the UV-cured lacquer forms a visible area designed as functional area. The invention further relates to said molding with the UV-cured lacquer layer as visible area designed as functional area.

BACKGROUND OF THE INVENTION

There are various known processes for production of plastics moldings in an injection mold. In the in-mold-decoration (IMD) process, a hot-stamping film wound up on a roll and with polyester film carrier is passed downward through an injection mold and, on closure of the mold, is held between the two mold halves. When the melt is injected, the film is forced onto the cavity wall by the pressure of the melt. By virtue of the high temperature of the melt, a lacquer layer of the hot-stamping film bonds to the plastic and, after cooling, separates from the polyester carrier film. The finished component can then be removed, while the carrier film is wound up on a second roll below the clamping unit, and a new decorative section is positioned in front of the cavity.

The IMD process is mainly used for components with little three-dimensional depth, for example for cell phone shells, flat decorative strips in automobile construction, or else other control panels in vehicles or in household applications. Moldings whose geometry prevents production by way of the in-mold-decoration process can be produced by way of the FIM process (film-insert-molding) process.

Film insert molding (FIM) is a specialized injection-molding process in which, before the injection of the plastics melt, three-dimensionally preformed inserts are inserted into the injection mold. The inserts are mostly printed films that have been subjected to a forming process and that are then trimmed. The forming process can use a mechanical or contactless method. The contactless methods are traditional thermoforming processes. These use by way of example the deep-draw-thermoforming process, where no precise positional accuracy can be achieved. When positional tolerances are narrower, the known high-pressure-forming (HIT) process is used. The films are in principle trimmed after the forming process. The familiar methods can be used here, for example punching, milling, blades, laser cutting, water-jet cutting.

A molding of the type mentioned in the introduction, and also a process for production of a molding of this type, are known from EP1695808B1. The decorative part comprises a backing part made of a thermoplastic with high mechanical strength and good impact resistance, and also an outer part which is made of a thermoplastic with a visible area designed as functional area, and which assumes a decorative function, being by way of example a high-gloss part composed of polymethyl methacrylate (PMMA). The decorative part is produced by the multicomponent injection-molding process. Although the visible area composed of PMMA is designed to have high gloss it does not have other required and desired properties, for example adequate scratch resistance and breaking strength.

DE 102010020039A1 discloses a process for production in an injection mold, of a plastics molding with a visible area designed as high-gloss area, where a film segment made of a thermoplastic carrier layer and of a cured coating is subjected to insert molding with a plastics melt, and the carrier layer with the cured layer, which faces toward the mold cavity, is thus forced entirely into the cavity of the mold and bonds to the melt. DE 102010020039A1 does not however disclose the nature of the coatings, and is vague in defining the carrier layers, and repetition by the person skilled in the art therefore has the inevitable result that defects appear in the peripheral region of the films, in the already precured coating, when the film sections are cut to size, and/or that microcracks can form at the small-radius areas and in the film surface during insert molding.

WO2005/080484 discloses a process for production of coated moldings, in particular motor vehicle parts, that is characterized in that a radiation-curable composite layered sheet or film made of at least one carrier layer and a lacquer layer composed of a radiation-curable composition is adhesive-bonded onto moldings, and then the lacquer layer is cured by radiation, or thermoforming is carried out in a thermoforming mold, and the reverse side of the carrier layer is subjected to insert molding with the plastics composition, where the radiation curing of the lacquer layer takes place after the thermoforming procedure, or after the thermoforming and insert molding. The shaping of the composite layer sheet or film via adhesive bonding or thermoforming implies an additional step, which can cause defects.

In the light of this, the object underlying the invention is to provide a simple and cost-effective process for production of moldings of high optical quality which at the same time comply with the requirements relating to the very wide variety of requirements such as scratch resistance, chemicals resistance, and UV resistance, and also to provide said moldings.

The object first mentioned is achieved via a process with the features of claim 1. The dependent claims relate to particularly advantageous embodiments of the invention.

The invention therefore provides a process for production, in an injection mold, of a plastics molding with a UV-cured lacquer and with a visible area designed as functional area, where the UV-cured lacquer forms said visible area, where
   a film segment that has not been preformed and that is in essence flat, composed of a carrier layer made of a thermoplastic and of a partially thermally cured UV-curable lacquer is arranged in a cavity of the injection mold in such a way that the partially cured lacquer layer faces toward a female-mold surface replicating the negative form of the visible area of the molding, and
   where the film segment arranged in the cavity is subjected to insert molding with a thermoplastic on a reverse-side surface facing away from the partially thermally cured UV-curable lacquer, in such a way that the carrier layer of the film segment bonds to the injected hot melt, and
   that a compressive force resulting from the injection pressure of the injected melt acts in the direction of the female-mold surface, whereupon, with exposure to the compressive force and to heating resulting from the direct contact with the hot melt, the entire area of the film segment is forced onto the female-mold surface and subjected to a three-dimensional forming process, and after removal of the molding, the partially thermally cured UV-curable lacquer is cured to completion by UV radiation and, on the molding, forms the visible area designed as functional area.

The process of the invention for production of the molding has the advantage that the three-dimensional forming process to which the film segment is subjected, and the insert molding to which the film is subjected, take place in a single injection mold, and a particularly simple and cost-effective process is thus provided. There is in principle no requirement for upstream production of a three-dimensionally preformed film insert, for example in thermoforming processes such as deep-draw (vacuum) thermoforming, high-pressure forming, pressing, or blow molding, and it is therefore possible to process films that have not been subjected to any forming process and are therefore inexpensive. Another advantage is that to some extent small-radius sections are also protectively covered by film and thus also by the lacquer layer, this being an essential requirement for many applications.

The use of partially thermally cured UV-curable lacquers as coating on the carrier layer avoids formation of defects at intersection points during foil preprocessing, and avoids formation of microcracks in the lacquer layer at the small-radius areas and on the surfaces during insert molding by plastics melt and the corresponding foil-forming process. This is surprising, because the person skilled in the art is aware that, during film insert molding, unhardened lacquer coatings on film carrier layers can separate and cause blistering.

The multilayer structure of the molding moreover to some extent achieves separation between function and optical properties. The desired optical properties of the molding, mainly a color pattern or an optical depth effect, and the mechanical strength of the molding are realized here via the combined effect of the carrier layer and of the main element which is made of thermoplastic and which is produced by subjecting the film to insert molding, while the very wide variety of required requirements such as chemicals resistance, UV resistance, and scratch resistance and, by way of example, a visible area of appropriate gloss are realized via the carrier layer and the lacquer coating. This applies to surfaces irrespective of whether they have high gloss, or are matt, or are a soft-touch surface.

The effect of the non-aggressive heating resulting from contact between the melt, the temperature of which is about 250° C. to 300° C., and the film, together with the uniform application of pressure on the reverse-side film surface by the melt, acting as ram, is that a semifinished product composed of a carrier layer and of a partially thermally cured UV-curable lacquer is subjected to a three-dimensional forming process without any alteration of and/or damage to the properties of the film or of the partially thermally cured UV-curable lacquer.

Before and/or during and/or after the production of the molding, the three-dimensional forming process on the film is assisted by the temperature-control of the injection-mold region delimiting the cavity. This temperature-control of the injection mold, composed of a female mold and of a male mold, to a temperature of about 30° C. to 120° C., preferably 50° C. to 100° C., and particularly preferably 60° C. to 90° C., cools the partially thermally cured UV-curable lacquer which is in contact with the female-mold surface, and which is a component of the film, in a manner that is advantageous for the forming process on the film, and that is effective in preventing any destruction, caused by excessive temperatures, of the partially thermally cured UV-curable lacquer.

It is moreover found to be advantageous that in the region of an injection aperture of the injection mold, the film segment is fixed in such a way that the compressive force resulting from the injection pressure of the injected melt acts toward the reverse-side surface facing away from the partially thermally cured, UV-curable lacquer layer on the film segment. It is also possible here that the film segment, which is in essence flat, undergoes a slight preforming process due to the fixing process: what is known as a 2.5 D (dimensional) forming process. 2D, or even 2.5D, fixing of the film prevents any undesired alteration of position of the film in the cavity as a consequence of the injection procedure, and ensures that the melt is conducted exclusively into a space between the reverse side of the film and the injection mold, and that the pressure force can thus be generated in the direction of the female-mold surface. Contamination of the film surface forming the visible area by melt entering into a space between the partially thermally cured UV-curable lacquer and the female-mold surface is thus prevented. The invention provides that molding segments or punched-up moldings, appropriate to the geometry of the cavity of the mold, are subjected to insert molding or to insert foaming. It is equally conceivable that uncut films are subjected to insert molding or to insert foaming; individual film regions of these are subjected to a continuous forming process via insert molding and insert foaming, and only after this are the materials subjected to cutting-to-size and to completion of curing by UV.

In another, particularly advantageous embodiment of the process of the invention, the film is subjected to insert foaming, for example via TFI, thermoplastic-foam injection molding. The polymer melt here is loaded with a blowing agent which, after the injection procedure, leads to foaming of the molding composition in the cavity. In principle, foams can be realized in the injection-molding process via chemical blowing agents or physical blowing agents (e.g. nitrogen or $CO_2$) in the plastics melt. It is also possible in some cases to use a combination of physical and chemical agents. The viscosity of the plastics melt can be reduced by way of example by using these solid, liquid, or gaseous additives, and it is thus possible to increase the flowability, or the flow-path length/wall thickness ratio, of the injected melt, and thus to use thin-wall technology to form the component. Thin-wall technology can advantageously reduce the total weight of the molding. A usual result of addition of additives of this type, on hardening of the thermoplastic, is streaking in the main element due to phase separation between the plastic and the additive. After injection of the plastic, the film segment arranged between the melt and the female-mold surface acts as thermal insulator between the melt, the temperature of which is about 250° C. to 300° C., and the female-mold surface, the temperature of which is about 70° C. to 90° C., and the region in the immediate vicinity of the film therefore cools more slowly than the remaining more distant region. As a consequence of these different cooling rates, the regions more distant from the film solidify more rapidly, and the phase separation, and also the resultant streaking, therefore take place exclusively in said region. In the region of the bond to the film, no streaks are produced, and it is thus possible to provide, as visible area, a surface with fully satisfactory optical properties, for example a high-gloss, matt, or soft-touch area.

Reinforced reaction injection molding (RRIM) is likewise conceivable in the invention, using by way of example polyurethanes or polyurethane foams, where at least two reactive components are mixed and are immediately transferred into the mold to complete a reaction.

Another modified embodiment of the process provides that before the film segment is subjected to insert molding, a color is applied at least on a section of a reverse-side surface facing away from the lacquer layer of the film segment. It is thus possible to produce moldings with patterns, ornamentation, writing, or logos, for example via printing, coating, or stamping. Because the applied color is arranged on the reverse side of the film it has long lasting protection not only from effects of weathering but also from any destruction due to direct mechanical action.

In this case it is clearly possible to use the injection-compression-molding process, where the plastics melt is injected into a mold that is not completely closed, but where instead, at the start of the injection process, there is a gap that is not closed until the injection procedure has begun. The plastics melt thus becomes distributed around injection points before it encounters the film; during the injection process there is thus markedly less adverse effect of temperature, and resultant shear, and there is less color leaching on the reverse side of the film.

In a method that has moreover proven to be particularly relevant to actual practice, at least one functional element is molded onto the molding, and in particular is a gasket and/or a means for the fixing of the molding, and/or is a means of holding a gasket, and/or is a stiffening element. It is thus possible to produce a one-part molding via a simple injection-molding process, where all of the functional and design properties have been integrated within a single one-piece component.

The invention further provides that the molding is produced by subjecting the film segment to insert molding in the single- or multicomponent injection-molding process. The multicomponent injection-molding process can fulfill all of the requirements placed upon the molding in respect of optical and mechanical properties, and of other functional properties, in an ideal manner by combining plastics with various properties.

The dependent claims provide particularly advantageous embodiments of the invention.

The invention provides a plastics molding with a visible area designed as functional area, where the molding is composed of a main element made of a thermoplastic and, bonded to the main element, a film which comprises a thermoplastic carrier layer and, arranged on the visible side, a partially thermally cured lacquer that can be cured to completion by UV, hereinafter referred to as lacquer layer, where the main element has been injection-molded on a surface facing away from the lacquer layer on the film, and at least a section of a visible area formed by the film has been three-dimensionally shaped.

The multilayer structure of the molding ensures at least to some extent a functional separation, where the desired color properties or depth effect, i.e. the optical function, and the mechanical strength are realized via the main element and the carrier layer, while other functional properties, for example UV resistance and scratch resistance or optical properties such as the degree of gloss of the visible area, are provided by the carrier layer acting together with the lacquer layer.

The expression "a visible area designed as functional area" means the outward-facing side of the molding, and the functional area here can be designed as high-gloss area, as matt area, or else as soft-touch area. Preference is given to design of the functional area as high-gloss area.

In another embodiment of the invention, the surface of the female mold has a grain, and therefore during the insert-molding process the lacquer layer is forced against the grained female-mold surface, and the resultant functional area of the visible area is provided with structuring, which may be fine structuring.

It is moreover found to be particularly advantageous for the main element to have at least one molded-on functional element, in particular a gasket and/or a means for the fixing of the molding, and/or a means of holding a gasket, and/or a stiffening element. It is thus possible to produce a molding via a simple injection-molding process, where all of the functional and design properties have been integrated within a single one-piece component.

The invention further provides that the main element and the functional elements are produced by subjecting the film to insert molding in the single- or multicomponent injection-molding process. The multicomponent injection-molding process can fulfill all of the requirements placed upon the molding in respect of optical and mechanical properties, and of other functional properties, in an ideal manner by combining plastics with various properties. It is possible by way of example that the main element uses a plastic other than that used for the functional elements.

A preferred molding has by way of example the following layer structure, where the alphabetic sequence corresponds to the spatial arrangement:

A) lacquer that has been partially thermally cured, completion of curing thereof then being achieved by UV (lacquer layer)

B) carrier layer

C) colorant layer (optionally)

D) main element and/or functional element.

In an advantageous embodiment of the molding of the invention, a color is applied at least on a section of a reverse-side surface facing away from the lacquer layer of the carrier layer of the film. The color can by way of example be applied via printing or stamping on the film surface. It is thus possible to provide the moldings with a pattern, with ornamentation, with writing, or with logos. Because the applied color is arranged on the reverse side of the carrier layer of the film it has long lasting protection not only from effects of weathering but also from any destruction due to direct mechanical action. It is likewise conceivable, before and after the completion of curing by UV, for an additional application of color to be achieved via screen printing, stamping, or rolling processes, on the lacquer layer that is cured to completion by UV.

The carrier layer is intended to ensure that the entire film composite has long lasting high toughness, while the main element withstands mechanical load on the molding. It is preferable that the carrier layer and/or the main element is/are composed of a thermoplastic polymer, in particular of polycarbonates, polymethyl methacrylates, polybutyl methacrylates, polyethylene terephthalates, polybutylene terephthalates, polyvinylidene fluorides, polyvinyl chlorides, polyester, polyolefins, acrylonitrile-ethylene-propylene-diene-styrene copolymers (A-EPDM), polyetherimides, polyetherketones, polyphenylene sulfides, polyphenylene ether, poly- or copolycondensates of terephthalic acid, by way of example and preferably poly- or copolyethyiene terephthalate (PET or CoPET), glycol-modified PET (PETG), glycol-modified poly- or copolycyclohexanedimethylene terephthalate (PCTG), poly- or copolybutylene terephthalate (PBT or CoPBT), other amorphous (co)polyesters, or a mixture of these.

Mention may also be made of polyethylene, polypropylene, polystyrene, polybutadiene, polyester, polyamide, polyether, polyvinyl acetal, polyacrylonitrile, polyacetal, polyvinyl alcohol, polyvinyl acetate, phenolic resins, urea resins, melamine resins, alkyd resins, epoxy resins, or polyurethanes, block or graft copolymers of these, and blends thereof.

Mention may be made of the following as preferred: ABS, AES, ANIMA, ASA, EP, EPS, EVA, EVAL, HDPE, LDPE, MABS, MBS, MF, PA, PA6, PA66, PAN, PB, PBT, PBTP, PC, PE, PEC, PEEK, PEI, PEK, PEP, PES, PET, PETP, PF, PI, PIB, PMMA, POM, PP, PPS, PS, PSU, PUR, PVAC, PVAL, PVC, PVDC, PVP, SAN, SB, SMS, UF, UP plastics (abbreviations in accordance with DIN 7728), and aliphatic polyketones.

Particularly preferred carriers are polyolefins, such as PP (polypropylene), which can, as desired, be isotactic, syndiotactic, or atactic and can, as desired, be unoriented or oriented via mono- or biaxial stretching, SAN (styrene-acrylonitrile copolymers), PC (polycarbonates), PMMA (polymethyl methacrylates), PBT (poly(butylene terephthalate)s), PA (polyamides), ASA (acrylonitrile-styrene-acrylate copolymers), and ABS (acrylonitrile-butadiene-styrene copolymers), and also physical mixtures (blends) of these. Particular preference is given to PP, SAN, ABS, ASA, and also blends of ABS or ASA with PA or PBT or PC.

Very particular preference is given to polycarbonate. Preference is likewise given to polymethyl methacrylate (PMMA) or impact-modified PMMA, or amorphous (co) polyester.

Suitable polycarbonates for the production of the carrier layers of the invention and/or main elements/functional elements of the invention are any of the known polycarbonates. These are homopolycarbonates, copolycarbonates, and thermoplastic polyester carbonates. Preference is given to a polycarbonate sheet or polycarbonate film as carrier layer, and to a polycarbonate molding as main element.

Preferred thermoplastics are polycarbonates or copolycarbonates, poly- or copolyacrylates, poly- or copolymethacrylates, or blends comprising at least one of these thermoplastics. Particular preference is given to polycarbonates or copolycarbonates, in particular with average molecular weights Mw of from 500 to 100 000, preferably from 10 000 to 80 000, more preferably from 15 000 to 40 000, or blends of these with at least one poly- or copolycondensate of terephthalic acid with average molecular weights Mw of from 10 000 to 200 000, preferably from 26 000 to 120 000, or poly- or copolyacrylates and poly- or copolymethacrylates with average molecular weights Mw in a range from 30 000 to 300 000, particularly preferably in the range from 80 000 to 250 000.

Suitable poly- or copolycondensates of terephthalic acid in preferred embodiments of the invention are polyalkylene terephthalates. Examples of suitable polyalkylene terephthalates are reaction products of aromatic dicarboxylic acids or of their reactive derivatives (e.g. dimethyl esters or anhydrides) and of aliphatic, cycloaliphatic, or araliphatic diols, and mixtures of these reaction products.

Preferred polyalkylene terephthalates can be produced from terephthalic acid (or from its reactive derivatives) and from aliphatic or cycloaliphatic diols having from 2 to 10 C atoms, by known methods (Kunststoff-Handbuch [Plastics handbook], vol. VIII, pp. 695 ff, Karl-Hanser-Verlag, Munich, 1973).

Preferred polyalkylene terephthalates comprise at least 80 mol %, preferably 90 mol %, of terephthalic acid, based on the dicarboxylic acid component, and at least 80 mol %, preferably at least 90 mol % of ethylene glycol moieties and/or of 1,4-butanediol moieties and/or of 1,4-cyclohexanedimethanol moieties, based on the diol component.

The preferred polyalkylene terephthalates can comprise, alongside terephthalic acid moieties, up to 20 mol % of moieties of other aromatic dicarboxylic acids having from 8 to 14 C atoms, or of aliphatic dicarboxylic acids having from 4 to 12 C atoms, for example moieties of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates can comprise, alongside ethylene moieties and, respectively, butane-1,4-glycol moieties, up to 80 mol % of other aliphatic diols having from 3 to 12 C atoms, or of cycloaliphatic diols having from 6 to 21 C atoms, e.g. moieties of 1,3-propanediol, 2-ethyl-1,3-propanediol, neopentyl glycol, 1,5-pentanediol, 1,6-hexanediol, 1,4-cyclohexanedimethanol, 3-methyl-2,4-pentanediol, 2-methyl-2,4-pentanediol, 2,2,4-trimethyl-1,3-pentanediol, and 2-ethyl-1,6-hexanediol, 2,2-diethyl-1,3-propanediol, 2,5-hexanediol, 1,4-di-([beta]hydroxyethoxy)benzene, 2,2-bis(4-hydroxycyclohexyl) propane, 2,4-dihydroxy-1,1,3,3-tetramethylcyclobutane, 2,2-bis(3-[beta]hydroxyethoxyphenyl)propane and 2,2-bis (4-hydroxypropoxyphenyl)propane (cf. DE-OS (German Published Specification) 24 07 674, 24 07 776, 27 15 932).

The polyalkylene terephthalates can be branched via incorporation of relatively small quantities of trihydric or tetrahydric alcohols or of tribasic or tetrabasic carboxylic acids, for example those described in DE-OS (German Published Specification) 19 00 270 and of U.S. Pat. No. 3,692,744. Examples of preferred branching agents are trimesic acid, trimetallic acid, trimethylolethane and trimethylolpropane and pentaerythritol.

It is preferable to use no more than 1 mol % of the branching agent, based on the acid component.

Particular preference is given to polyalkylene terephthalates produced solely from terephthalic acid and reactive derivatives thereof (e.g. dialkylesters thereof) and ethylene glycol and/or 1,4-butanediol and/or 1,4-cyclohexanedimethanol moieties, and to mixtures of these polyalkylene terephthalates.

Other preferred polyalkylene terephthalates are copolyesters produced from at least two of the abovementioned acid components and/or from at least two of the abovementioned alcohol components, and particularly preferred copolyesters are polyethylene glycol/1,4-butanediol) terephthalate.

The intrinsic viscosity of polyalkylene terephthalates preferably used as component is about 0.4 to 1.5 dl/g, preferably 0.5 to 1.3 dl/g, measured in each case in phenol/o-dichlorobenzene (1:1 parts by weight) at 25° C.

In particularly preferred embodiments of the invention, the blend of at least one polycarbonate or copolycarbonate with at least one poly- or copolycondensate of terephthalic acid is a blend of at least one polycarbonate or copolycarbonate with poly- or copolybutylene terephthalate or with glycol-modified poly- or copolycyclohexanedimethylene terephthalate. This type of blend of polycarbonate or copolycarbonate with poly- or copolybutylene terephthalate or with glycol-modified poly- or copolycyclohexanedimethylene terephthalate can preferably be one with from 1 to 90% by weight of polycarbonate or copolycarbonate and from 99 to 10% by weight of poly- or copolybutylene terephthalate or of glycol-modified poly- or copolycyclohexanedimethylene terephthalate, preferably with from 1 to 90% by weight of polycarbonate and from 99 to 10% by weight of polybutylene terephthalate or of glycol-modified polycyclohexanedimethylene terephthalate, where the proportions give a total of 100% by weight. This type of blend of polycarbonate or copolycarbonate with poly- or copolybutylene terephthalate or glycol-modified poly- or copolycyclohexanedimethylene terephthalate can preferably be one with from 20 to 85% by weight of polycarbonate or copolycarbonate and from 80 to 15% by weight of poly- or copolybutylene terephthalate or of glycol-modified poly- or copolycyclohexanedimethylene terephthalate, preferably from 20 to 85% by weight of polycarbonate and from 80 to 15% by weight of polybutylene terephthalate or of glycol-modified polycyclohexanedimethylene terephthalate, where the proportions give a total of 100% by weight. This type of blend of polycarbonate or copolycarbonate with poly-copolybutylene terephthalate or with glycol-modified poly- or copolycyclohexanedimethylene terephthalate can very particularly preferably be one with 35 to 80% by weight of polycarbonate or copolycarbonate and from 65 to 20% by weight of poly-copolybutylene terephthalate or of glycol-modified poly- or copolycyclohexanedimethylene terephthalate, preferably from 35 to 80% by weight of polycarbonate and from 65 to 20% by weight of polybutylene terephthalate or of glycol-modified polycyclohexanedimethylene terephthalate, where the proportions give a total of 100% by weight. In very particularly preferred embodiments, the blends can be blends of polycarbonate and of glycol-modified polycyclohexanedimethylene terephthalate in the compositions mentioned above.

Suitable polycarbonates or copolycarbonates in preferred embodiments are in particular aromatic polycarbonates or copolycarbonates.

The polycarbonates or copolycarbonates can, as is known, be linear or branched.

These polycarbonates can be produced in a known manner from diphenols, carbonic acid derivatives, optionally chain terminators, and optionally branching agents. Details of the production of polycarbonates have been set out in many patents in the last approximately 40 years. Reference may be made here by way of example to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertne', BAYER AG, "Polycarbonates" in Encyclopedia of Polymer Science and Engineering, Volume 11, Second Edition, 1988, pages 648-718, and finally to Dres. U. Grigo, K. Kirchner and P. R. Müller "Polycarbonate" [Polycarbonates] in Becker/Braun, Kunststoff-Handbuch [Plastics handbook], vol. 3/1, Polycarbonate, Polyacetale, Polyester, Celluloseester [Polycarbonates, polyacetals, polyesters, cellulose esters], Carl Hanser Verlag Munich, Vienna, 1992, pages 117-299.

Suitable diphenols can by way of example be dihydroxyaryl compounds of the general formula (I),

HO—Z—OH  (I)

in which Z is an aromatic moiety which has from 6 to 34 carbon atoms and which can comprise one or more optionally substituted aromatic rings and aliphatic or cycloaliphatic moieties and, respectively, alkylaryl moieties or heteroatoms as bridging members.

Examples of suitable dihydroxyaryl compounds are: dihydroxybenzenes, dihydroxybiphenyls, bis(hydroxyphenyl)alkanes, bis(hydroxyphenyl)cycloalkanes, bis(hydroxyphenyl)aryl compounds, bis(hydroxyphenyl)ethers, bis(hydroxyphenyl) ketones, bis(hydroxyphenyl)sulfides, bis(hydroxyphenyl)sulfones, bis(hydroxyphenyl)sulfoxides, 1,1'-bis(hydroxyphenyl)diisopropylbenzenes, and also ring-alkylated and ring-halogenated compounds derived from these.

These and other suitable dihydroxyaryl compounds are described by way of example in DE-A 3 832 396, FR-A 1 561 518, in H. Schnell, Chemistry and Physics of Polycarbonates, Interscience Publishers, New York, 1964. pp. 28 ff; pp. 102 ff and in D. G. Legrand, J. T. Bendler, Handbook of Polycarbonate Science and Technology, Marcel Dekker, New York, 2000, pp. 72 ff.

Preferred dihydroxyaryl compounds are by way of example resorcinol, 4,4'-dihydroxybiphenyl, bis(4-hydroxyphenyl)methane, bis(3,5-dimethyl-4-hydroxyphenypmenyl) methane, bis(4-hydroxyphenyl)diphenylmethane, 1,1-bis(4-hydroxyphenyl)-1-phenylethane, 1,1-bis(4-hydroxyphenyl)-1-(1-naphthyl)ethane, 1,1-bis(4-hydroxyphenyl)-1-(2-naphthyl)ethane, 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(4-hydroxyphenyl)-1-phenylpropane, 2,2-bis(4-hydroxyphenyl)hexa-fluoropropane, 2,4-bis(4-hydroxyphenyl)-2-methylbutane, 2,4-bis(3,5-dimethyl-4-hydroxyphenyl)-2-methylbutane, 1,1-bis(4-hydroxyphenyl) cyclohexane, 1,1-bis(3,5-dimethyl-4-hydroxyphenyl) cyclohexane, 1,1-bis(4-hydroxyphenyl)-4-methylcyclohexane, 1,3-bis[2-(4-hydroxyphenyl)-2-propyl] benzene, 1,1'-bis(4-hydroxyphenyl)-3-diisopropylbenzene, 1,1'-bis(4-hydroxyphenyl)-4-diisopropylbenzene, 1,3-bis[2-(3,5-dimethyl-4-hydroxyphenyl)-2-propyl]benzene, bis(4-hydroxyphenyl)ether, bis(4-hydroxyphenyl)sulfide, bis(4-hydroxyphenyl)sulfone, bis(3,5-dimethyl-4-hydroxyphenyl) sulfone and 2,2'3,3'-tetrahydro-3,3,3'3'-tetramethyl-1,1'-spirobi[1H-indene]-5,5'-diol or dihydroxydiphenylcycloalkanes of the formula (Ia)

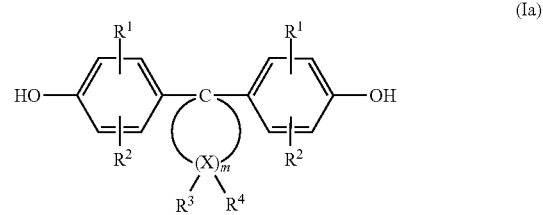

(Ia)

in which $R^1$ and $R^2$ are mutually independently hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, in particular benzyl, m is an integer from 4 to 7, preferably 4 or 5, $R^3$ and $R^4$ can be selected individually for each X, and are mutually independently hydrogen or $C_1$-$C_6$-alkyl and X is carbon, with the proviso that on at least one atom X, $R^3$ and $R^4$ are simultaneously alkyl. It is preferable that in the formula (Ia) $R^3$ and $R^4$ are simultaneously alkyl on one or two atoms(s) X, in particular only on one atom X.

Preferred alkyl moiety for the moieties $R^3$ and $R^4$ in formula (Ia) is methyl. The X atoms in alpha-position with respect to the diphenyl-substituted C atom (C-1) are preferably not dialkyl-substituted, whereas the alkyl disubstitution in beta-position with respect to C-1 is preferred.

Particularly preferred dihydroxydiphenylcycloalkanes of the formula (Ia) are those having 5 and 6 ring C atoms X in the cycloaliphatic moiety (m=4 or 5 in formula (Ia)), for example the diphenols of the formulae (Ia-1) to (Ia-3),

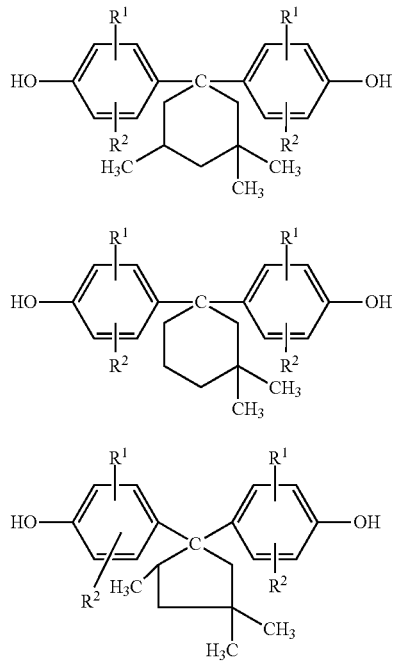

A very particularly preferred dihydroxydiphenylcycloalkane of the formula (Ia) is 1,1-bis(4-hydroxyphenyl)-3,3,5-trimethylcyclohexane (formula (Ia-1) where $R^1$ and $R^2$ are H).

Polycarbonates of this type can be produced in accordance with EP-A 359 953 from dihydroxydiphenylcycloalkanes of the formula (Ia).

Particularly preferred dihydroxyaryl compounds are resorcinol, 4,4'-dihydroxybiphenyl, bis(4-hydroxyphenyl)diphenylmethane, 1,1-bis(4-hydroxyphenyl)-1-phenylethane, bis(4-hydroxyphenyl)-1-(1-naphthypethane, bis(4-hydroxyphenyl)-1-(2-naphthyl)ethane, 2,2-bis(4-hydroxyphenyl)propane, 2,2-bis(3,5-dimethyl-4-hydroxyphenyl)propane, 1,1-bis(4-hydroxyphenyl)cyclohexane, 1,1-bis(3,5-dimethyl-4-hydroxyphenyl)cyclohexane, 1,1-bis(4-hydroxyphenyl)-3,3,5-trimethylcyclohexane, 1,1'bis(4-hydroxyphenyl)-3-diisopropylbenzene and 1,1'-bis(4-hydroxyphenyl)-4-diisopropylbenzene.

Very particularly preferred dihydroxyaryl compounds are 4,4'-dihydroxybiphenyl, 2,2-bis(4-hydroxyphenyl)propane and 1,1-bis-(4-hydroxyphenyl)-3,3,5-trimethylcyclohexane.

It is possible to use either one dihydroxyaryl compound with formation of homopolycarbonates or else various dihydroxyaryl compounds with formation of copolycarbonates. It is possible to use either one dihydroxyaryl compound of the formula (I) or (Ia) with formation of homopolycarbonates or else a plurality of dihydroxyaryl compounds of the formula (I) and/or (Ia) with formation of copolycarbonates. The manner of linkage of the various dihydroxyaryl compounds to one another here can either be random or else can give blocks. In the case of copolycarbonates made of dihydroxyaryl compounds of the formula (I) and (Ia), the molar ratio of dihydroxyaryl compounds of the formula (Ia) to the other dihydroxyaryl compounds of the formula (I) optionally to be used concomitantly is preferably from 99 mol % of (Ia) to 1 mol % of (I) to 2 mol % of (Ia) to 98 mol % of (I), preferably from 99 mol % of (Ia) to 1 mol % of (I) to 10 mol % of (Ia) to 90 mol % of (I) and in particular from 99 mol % of (Ia) to 1 mol % of (I) to 30 mol % of (Ia) to 70 mol % of (I).

A very particularly preferred copolycarbonate can be produced by using 1,1-bis(4-hydroxyphenyl)-3,3,5-trimethylcyclohexane and 2,2-bis-(4-hydroxyphenyl)propane dihydroxyaryl compounds of the formula (Ia) and (I).

Poly- or copolycarbonates prepared using dihydroxyaryl compound of the formula (Ia) typically have higher glass transition temperature Tg and Vicat softening temperature B/50 than polycarbonate based on 2,2-bis-(4-hydroxyphenyl)propane as dihydroxyaryl compound.

Suitable carbonic acid derivatives can by way of example be diaryl carbonates of the general formula (II)

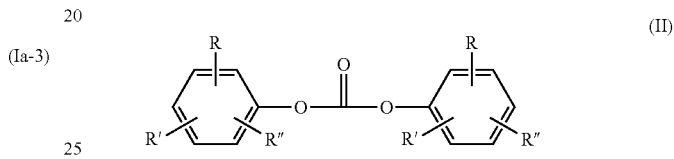

in which

R, R' and R" are mutually independently, being identical or different, hydrogen, linear or branched $C_1$-$C_{34}$-alkyl, $C_7$-$C_{34}$-alkylaryl or $C_6$-$C_{34}$-aryl, R can also be —COO—R''', where R''' is hydrogen, linear or branched $C_1$-$C_{34}$-alkyl, $C_7$-$C_{34}$-alkylaryl or $C_6$-$C_{34}$-aryl.

Examples of preferred diaryl carbonates are diphenyl carbonate, methylphenyl phenyl carbonates and di(methylphenyl)carbonates, 4-ethylphenyl phenyl carbonate, di(4-ethylphenyl)carbonate, 4-n-propylphenyl phenyl carbonate, di(4-n-propylphenyl)carbonate, 4-isopropylphenyl phenyl carbonate, di(4-isopropylphenyl)carbonate, 4-n-butylphenyl carbonate, di(4-n-butylphenyl)carbonate, 4-isobutylphenyl phenyl carbonate, di(4-isobutylphenyl)carbonate, 4-tert-butylphenyl phenyl carbonate, di(4-tert-butylphenyl)carbonate, 4-n-pentylphenyl phenyl carbonate, di(4-n-pentylphenyl)carbonate, 4-n-hexylphenyl phenyl carbonate, di(4-n-hexylphenyl)carbonate, 4-isooctylphenyl phenyl carbonate, di(4-isooctylphenyl)carbonate, 4-n-nonylphenyl phenyl carbonate, di(4-n-nonylphenyl)carbonate, 4-cyclohexylphenyl phenyl carbonate, di(4-cyclohexylphenyl)carbonate, 4-(1-methyl-1-phenylethyl)phenyl phenyl carbonate, di[4-(1-methyl-1-phenylethyl)phenyl]carbonate, biphenyl-4-yl phenyl carbonate, di(biphenyl-4-yl)carbonate, 4-(1-naphthyl)phenyl phenyl carbonate, 4-(2-naphthyl)phenyl phenyl carbonate, di[4-(1-naphthyl)phenyl] carbonate, di[4-(2-naphthyl)phenyl]carbonate, 4-phenoxyphenyl phenyl carbonate, di(4-phenoxyphenyl)carbonate, 3-pentadecylphenyl phenyl carbonate, di(3-pentadecylphenyl)carbonate, 4-tritylphenyl phenyl carbonate, di(4-tritylphenyl)carbonate, methyl salicylate phenyl carbonate, di(methyl salicylate)carbonate, ethyl salicylate phenyl carbonate, di(ethyl salicylate)carbonate, n-propyl salicylate phenyl carbonate, di(n-propyl salicylate)carbonate, isopropyl salicylate phenyl carbonate, di(isopropyl salicylate)carbonate, n-butyl salicylate phenyl carbonate, di(n-butyl salicylate)carbonate, isobutyl salicylate phenyl carbonate, di(isobutyl salicylate)carbonate, tert-butyl salicylate phenyl carbonate, di(tert-butyl salicylate)carbonate, di(phenyl salicylate)carbonate and di(benzyl salicylate)carbonate.

Particularly preferred diaryl compounds are diphenyl carbonate, 4-tert-butylphenyl phenyl carbonate, di(4-tert-butylphenyl)carbonate, biphenyl-4-yl phenyl carbonate, di(biphenyl-4-yl)carbonate, 4-(1-methyl-1-phenylethyl)phenyl phenyl carbonate, di[4-(1-methyl-1-phenylethyl)phenyl]carbonate and di(methyl salicylate)carbonate.

Diphenyl carbonate is very particularly preferred.

It is possible to use either one diaryl carbonate or else various diaryl carbonates.

In order to control and/or modify the terminal groups, use may also be made by way of example of one or more monohydroxyaryl compound(s) as chain terminator(s) which has/have not been used for producing the diaryl carbonate(s) used. These can involve those of the general formula (III),

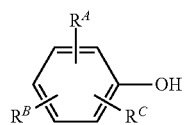

(III)

in which
$R^A$ is linear or branched $C_1$-$C_{34}$-alkyl, $C_7$-$C_{34}$-alkylaryl or $C_6$-$C_{34}$-aryl or —COO—$R^D$, where $R^D$ is hydrogen, linear or branched $C_1$-$C_{34}$-alkyl, $C_7$-$C_{34}$-alkylaryl or $C_6$-$C_{34}$-aryl, and $R^B$ and $R^C$ are mutually independently, being identical or different, hydrogen, linear or branched $C_1$-$C_{34}$-alkyl, $C_7$-$C_{34}$-alkylaryl or $C_6$-$C_{34}$-aryl.

Examples of these monohydroxyaryl compounds are 1-, 2- or 3-methylphenol, 2,4-dimethylphenol, 4-ethylphenol, 4-n-propylphenol, 4-isopropylphenol, 4-n-butylphenol, 4-isobutylphenol, 4-tert-butylphenol, 4-n-pentylphenol, 4-n-hexylphenol, 4-isooctylphenol, 4-n-nonylphenol, 3-pentadecylphenol, 4-cyclohexylphenol, 4-(1-methyl-1-phenylethyl)phenol, 4-phenylphenol, 4-phenoxyphenol, 4-(1-naphthyl)phenol, 4-(2-naphthyl)phenol, 4-tritylphenol, methyl salicylate, ethyl salicylate, n-propyl salicylate, isopropyl salicylate, n-butyl salicylate, isobutyl salicylate, tert-butyl salicylate, phenyl salicylate and benzyl salicylate.

Preference is given to 4-tert-butylphenol, 4-isooctylphenol and 3-pentadecylphenol.

Suitable branching agents can be compounds having three or more functional groups, preferably those having three or more hydroxy groups.

Suitable compounds having three or more phenolic hydroxy groups are by way of example phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis(4,4-bis(4-hydroxyphenyl)cyclohexyl]propane, 2,4-bis(4-hydroxyphenylisopropyl)phenol and tetra(4-hydroxyphenyl)methane.

Other suitable compounds having three or more functional groups are by way of example 2,4-dihydroxybenzoic acid, the trichloride of trimesic acid, the trichloride of cyanuric acid and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane, The polymethyl (meth)acrylate used can comprise both polymethyl (meth)acrylate (PMMA) and impact-modified PMMA (im-PMMA), PMMA blends, or im-PMMA blends. They are obtainable under the trademark Plexiglas from Röhm GmbH. The expression polymethyl (meth)acrylate means not only polymers of methacrylic acid and of its derivatives, for example its esters, but also polymers of acrylic acid and of its derivatives, and also mixtures of the above two components.

Preference is given to polymethyl (meth)acrylate plastics with at least 80% by weight content of methyl methacrylate monomer, preferably at least 90% by weight, and optionally from 0% by weight to 20% by weight, preferably from 0% by weight to 10% by weight, of other vinylically copolymerizable monomers, such as $C_1$-bis $C_8$-alkyl esters of acrylic acid or of methacrylic acid, e.g. methyl acrylate, ethyl acrylate, butyl acrylate, butyl methacrylate, hexyl methacrylate, cyclohexyl methacrylate, and also styrene and styrene derivatives, such as [alpha]-methylstyrene, or p-methylstyrene. Other monomers can be acrylic acid, methacrylic acid, maleic anhydride, hydroxy esters of acrylic acid, or hydroxy esters of methacrylic acid.

The thermoplastic polymers can comprise antioxidants which substantially increase stability. Substances such as carbon black, kieselguhr, kaolin, clays, $CaF_2$, $CaCO_3$, aluminum oxides, glass fibers, and inorganic pigments, and also fillers and nucleating agents, can be added in order to modify the products of the invention. Film and/or main element can be designed with colors independently of one another in the invention.

In another embodiment of the invention, the plastics sheets or plastics films are transparent.

Any of the transparent thermoplastics can be used as plastics for transparent sheets or films of the invention, or else as main element: polyacrylates, polymethyl methacrylates (PMMA; Plexiglas® from Röhm), cycloolefin copolymers (COC; Topas® from Ticona); Zenoex® from Nippon Zeon, or Apel® from Japan Synthetic Rubber), polysulfones (Ultrason@ from BASF or Udel® from Solvay), polyesters, e.g. PET or PEN, polycarbonate, polycarbonate/polyester blends, e.g. PC/PET, polycarbonate/polycyclohexylmethanol cyclohexanedicarboxylate (PCCD; Xylecs® from GE) and polycarbonate/polybutylene terephthalate (PBT) blends.

It is preferable to use polycarbonates, polyesters, or coextruded polycarbonate/polyesters, or PMMA.

It is found here to be particularly advantageous that the film and/or the main element is/are transparent. Combination of a transparent film with a transparent insert-molding material as main element can achieve optical depth effects.

In a method that has proven successful in practice, the main element and/or the carrier layer of the film is/are composed of polycarbonate (PC), (co)polyester, or polymethyl methacrylate (PMMA), and at least the material of the carrier layer of the film here should be transparent. Materials that can be used for the main element, i.e. as insert-molding material, are not only PC, (co)polyesters, and PMMA but also the abovementioned thermoplastics. The main element can be produced in various colors, in particular in black.

The film serves as carrier material for the lacquer layer of the invention and for the resultant composite material, and not only has to have general stability requirements but also especially has to have the necessary thermoformability.

The carrier layer preferably takes the form of films of thickness from 50 to 5000 μm, preferably from 100 to 2000 μm, particularly preferably from 125 μm to 1000 μm, or from 175 μm to 700 μm. Particular preference is given to film thicknesses of 280 μm. The polymer of the carrier layer can optionally comprise additives such as stabilizers, fillers such as fibers, and dyes.

Both of the surfaces of the carrier films can be glossy or matt, or else one of these surfaces can be glossy and one can be matt.

The use, in the lacquer layer on the carrier layer, of a partially thermally cured lacquer, curing of which is then completed by UV, provides a particularly robust, chemicals-resistant and scratch-resistant surface which surprisingly can also give excellent results in a three-dimensional forming process via the process of the invention, without any alteration of properties, or destruction of or damage to, the lacquer layer.

The layer thickness (after drying and curing) of the partially thermally cured lacquer, curing of which is then completed by UV, is from 1 to 100 μm, preferably from 5 to 50 μm, particularly preferably from 20 to 40 μm, very particularly preferably 30 μm.

The lacquer layer is amenable to partial thermal curing and to completion of curing by UV radiation. The lacquer layer used therefore comprises a lacquer formulation that is amenable to thermal curing and to curing by UV radiation, and that comprises polyaddition groups and free-radical groups (abbreviated to curable groups).

It is preferable that the lacquer is transparent. It is preferable that the lacquer layer is also transparent after partial curing and completion of curing, i.e. that it is a clearcoat layer.

The lacquer formulations of the invention comprise:
A) one or more compounds which comprise at least one chemical function a) suitable for polyaddition with component B) and different from b), which
A1) comprise no ethylenically unsaturated double bonds and/or
A2) comprise ethylenically unsaturated double bonds, and
B) one or more compounds which comprise at least one chemical function b) suitable for polyaddition with component A) and different from a), which
B1) comprise no ethylenically unsaturated double bonds and/or
B2) comprise ethylenically unsaturated double bonds,
where at least one of components A and B must comprise ethylenically unsaturated double bonds, and also optionally
C) ethylenically unsaturated compounds which have no chemical functions suitable for polyaddition
D) photoinitiators
E) optionally additives such as stabilizers, catalysts and other auxiliaries and additional substances,
F) optionally nonfunctional polymers and/or fillers.

Suitable chemical functions a) and b) for the polyaddition are in principle any of the functions usually used in coating technology. The following are in particular suitable: isocyanate-hydroxy/thiol/amine, carboxylate-epoxide, melamine-hydroxy, and carbamate-hydroxy. Very particular preference is given to the following as function a): isocyanates, which may also be in blocked form, and to the following as function b): hydroxy, primary and/or secondary amines, and also asparaginate.

Isocyanates A used comprise aromatic, araliphatic, aliphatic, and cycloaliphatic di- or polyisocyanates. It is also possible to use mixtures of these di- or polyisocyanates. Examples of suitable di- or polyisocyanates are butylene diisocyanate, hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes, and mixtures of these of any desired isomer content, isocyanatomethyl octane 1,8-diisocyanate, cyclohexylene 1,4-diisocyanate, the isomeric cyclohexanedimethylene diisocyanates, phenylene 1,4-diisocyanate, tolylene 2,4- and/or 2,6-diisocyanate, naphthylene 1,5-diisocyanate, diphenylmethane 2,4'- or 4,4'-diisocyanate, triphenylmethane 4,4',4''-triisocyanate, or derivatives of these having urethane structure, urea structure, carbodiimide structure, acylurea structure, isocyanurate structure, allophanate structure, biuret structure, oxadiazinetrione structure, uretdione structure, iminooxadiazinedione structure, and mixtures of same. Preference is given to polyisocyanates based on oligomerized and/or derivatized diisocyanates which have been freed from excess diisocyanate by suitable processes, in particular those of hexamethylene diisocyanate, isophorone diisocyanate, and of the isomeric bis(4,4'-isocyanatocyclohexyl)methanes, and also mixtures of these. Preference is given to the oligomeric isocyanurates, uretdiones, allophanates, and iminooxadiazinediones of HDI, of IPDI and/or of the isomeric bis(4,4'-isocyanatocyclohexyl)methanes, and also mixtures of these. Particular preference is given to the oligomeric isocyanurates, uretdiones, and allophanates of IPDI, and also the oligomeric isocyanurates of the isomeric bis(4,4'-isocyanatocyclohexyl)methanes.

It is optionally also possible to use the abovementioned isocyanates A to some extent after reaction with isocyanate-reactive ethylenically unsaturated compounds. It is preferable to use, for this purpose, α,α-unsaturated carboxylic acid derivatives such as acrylates, methacrylates, maleinates, fumarates, maleimides, acrylamides, and also vinyl ethers, propenyl ethers, allyl ethers, and compounds comprising dicyclopentadienyl units, which have at least one group reactive toward isocyanates, and it is particularly preferable that these compounds are acrylates or methacrylates having at least one isocyanate-reactive group. Examples of hydroxy-functional acrylates or methacrylates that can be used are compounds such as 2-hydroxyethyl (meth)acrylate, polyethylene oxide mono(meth)acrylates, polypropylene oxide mono(meth)acrylates, polyalkylene oxide mono (meth)acrylates, poly("epsilon"-caprolactone) mono(meth) acrylates, e.g. Tone® M100 (Dow, USA), 2-hydroxypropyl (meth)acrylate, 4-hydroxybutyl (meth)acrylate, 3-hydroxy-2,2-dimethylpropyl (meth)acrylate, the hydroxyl-functional mono-, di-, or tetra(meth)acrylates of polyhydric alcohols such as trimethylolpropane, glycerol, pentaerythritol, dipentaerythritol, ethoxylated propoxylated, or alkoxylated trimethylolpropane, glycerol, pentaerythritol, dipentaerythritol, and technical mixtures of these. Other suitable compounds are isocyanate-reactive oligomers, or polymeric unsaturated compounds comprising acrylate groups and/or comprising methacrylate groups, alone or in combination with the abovementioned monomeric compounds.

It is optionally also possible to use the abovementioned isocyanates A to some extent after reaction with blocking agents known to the person skilled in the art from coating technology. The following may be mentioned as example of blocking agents: alcohols, lactams, oximes, malonic esters, alkyl acetoacetates, triazoles, phenols, imidazoles, pyrazoles, and also amines, e.g. butanon oxime, diisopropylamine, 1,2,4-triazole, dimethyl-1,2,4-triazole, imidazole, diethyl malonate, acetoacetic ester, acetone oxime, 3,5-dimethylpyrazole, epsilon-caprolactam, N-tert-butylbenzylamine, cyclopentanonecarboxyethyl ester, or any desired mixture of these blocking agents.

The average number of the functional groups a), i.e. by way of example of the isocyanate groups per molecule (functionality) of component A used is always <2.8, preferably from 1.5 to 2.5, particularly preferably from 1.8 to 2.1.

Compounds of component A1 that can be used are any of the abovementioned di- or polyisocyanates A individually or in any desired mixtures, where these have no ethylenically unsaturated functions.

Compounds of component A2 that can be used are any of the abovementioned compounds A individually or in any desired mixtures, where these have at least one isocyanate group and also have at least one ethylenically unsaturated function which, on exposure to actinic radiation, reacts with ethylenically unsaturated compounds to give polymerization.

Isocyanate-reactive compounds B are monomeric, oligomeric, or polymeric compounds, or else a mixture of one or more of said compounds.

Suitable compounds of component B are low-molecular-weight, short-chain aliphatic, araliphatic, or cycloaliphatic diols, triols, and/or higher polyols, where the term short-chain implies the presence of from 2 to 20 carbon atoms. Examples of diols are ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, positionally isomeric diethyloctanediols, 1,3-butylene glycol, cyclohexanediol, 1,4-cyclohexanedimethanol, 1,6-hexanediol, 1,2- and 1,4-cyclohexanediol, hydrogenated bisphenol A (2,2-bis(4-hydroxycyclohexyl)propane), 2,2-dimethyl-3-hydroxypropyl 2,2-dimethyl-3-hydroxypropionate. Examples of suitable triols are trimethylolethane, trimethylolpropane, and glycerol. Suitable alcohols of higher functionality of ditrimethylolpropane, pentaerythritol, dipentaerythritol, and sorbitol. Preference is given to aliphatic diols, and very particular preference is given to cycloaliphatic diols.

Other suitable compounds are relatively high-molecular-weight aliphatic and cycloaliphatic polyols such as polyester polyols, polyether polyols, polycarbonate polyols, hydroxy-functional acrylic resins, hydroxy-functional polyurethanes, hydroxy-functional epoxy resins, and corresponding hybrids (cf. Römpp Lexikon Chemie [Römpp's Encyclopedia of Chemistry], pp. 465-466, 10th edn., 1998, Georg-Thieme-Verlag, Stuttgart). Preference is given to (cyclo)aliphatic polyester polyols and/or (cyclo)aliphatic polycarbonate polyols, and very particular preference is given to those polyester and/or polycarbonate polyols which comprise aliphatic diols of branched linear structure.

Other compounds that can be used for component B are any of the compounds, individually or in any desired mixtures, which have at least one group reactive toward isocyanates, and have at least one unsaturated function which, on exposure to actinic radiation, reacts with ethylenically unsaturated compounds to give polymerization.

Preference is given to α,α-unsaturated carboxylic acid derivatives such as acrylates, methacrylates, maleinates, fumarates, maleimides, acrylamides, and also vinyl ethers, propenyl ethers, allyl ethers, and compounds comprising dicyclopentadienyl units and having at least one group reactive toward isocyanates, and it is particularly preferable that these compounds are acrylates and methacrylates having at least one isocyanate-reactive group.

Examples of hydroxy-functional acrylates or methacrylates that can be used are compounds such as 2-hydroxyethyl (meth)acrylate, polyethylene oxide mono(meth)acrylates, polypropylene oxide mono(meth)acrylates, polyalkylene oxide mono(meth)acrylates, poly(ε-caprolactone) mono(meth)acrylates, e.g. Tone® 100 (Dow, Schwalbach, Del.), 2-hydroxypropyl (meth)acrylate, 4-hydroxybutyl (meth) acrylate, 3-hydroxy-2,2-dimethylpropyl (meth)acrylate, the hydroxy-functional mono-, di- or tetraacrylates of polyhydric alcohols such as trimethylolpropane, glycerol, pentaerythritol, dipentaerythritol, ethoxylated, propoxylated, or alkoxylated trimethylolpropane, glycerol, pentaerythritol, dipentaerythritol, or technical mixtures of these.

Other suitable compounds are isocyanate-reactive oligomeric or polymeric unsaturated compounds comprising acrylate groups and/or comprising methacrylate groups, alone or in combination with the abovementioned monomeric compounds.

The production of polyester acrylates is described in DE-A 4 040 290 (pp. 3, line. 25-pp. 6, line 24), DE-A 3 316 592 (pp. 5, line. 14-pp. 11, line. 30) and P. K. T. Oldring (ed.), Chemistry & Technology of UV & EB Formulations For Coatings, Inks & Paints, vol. 2, 1991, SITA Technology, London, pp. 123-135.

It is equally possible to use the epoxy (meth)acrylates which contain hydroxy groups and are known per se, having OH contents of from 20 to 300 mg KOH/g, or polyurethane (meth)acrylates which contain hydroxy groups having OH contents of from 20 to 300 mg KOH/g, or acrylated polyacrylates having OH contents of from 20 to 300 mg KOH/g, or else a mixture of these with one another, and a mixture with unsaturated polyesters containing hydroxy groups, or else a mixture with polyester (meth)acrylates, or a mixture of unsaturated polyesters containing hydroxy groups with polyester (meth)acrylates. Compounds of this type are likewise described in P. K. T. Oldring (ed.), Chemistry & Technology of UV & EB Formulations For Coatings, Inks & Paints, vol. 2, 1991, SITA Technology, London pp. 37-56. Preference is given to polyester acrylates with defined hydroxy functionality.

Epoxy (meth)acrylates containing hydroxy groups are in particular based on reaction products of acrylic acid and/or methacrylic acid with epoxides (glycidyl compounds) of monomeric, oligomeric, or polymeric bisphenol A, bisphenol F, hexanediol and/or butanediol, or ethoxylated and/or propoxylated derivatives of these. Preference is further given to epoxy acrylates with defined functionality, for example from the reaction of an optionally unsaturated diacid such as fumaric acid, maleic acid, hexahydrophthalic acid, or adipic acid and glycidyl (meth)acrylate. Particular preference is given to aliphatic epoxyacrylates. Acrylated polyacrylates can be produced by way of example via reaction of glycidyl-functional polyacrylates with (meth) acrylic acid.

In isocyanate-reactive component B, the average number of groups reactive toward isocyanates is no more than 2.6 per molecule, preferably from 2.3 to 1.7, particularly preferably from 2.1 to 1.85.

Compounds of component B1 that can be used are any of the abovementioned isocyanate-reactive compounds B individually or in any desired mixtures, where these have no ethylenically unsaturated functions.

Compounds of component B2 that can be used are any of the abovementioned compounds B individually or in any desired mixtures, where these have at least one isocyanate-reactive group and also have at least one ethylenically unsaturated function which, on exposure to actinic radiation, reacts with ethylenically unsaturated compounds to give polymerization.

Component C can comprise one or more monomeric or polymeric compounds which bear at least one functional group, and which react with ethylenically unsaturated compounds to give polymerization on exposure to actinic radiation, and which have neither isocyanate groups nor isocyanate-reactive groups. Examples of these compounds are esters, carbonates, acrylates, ethers, urethanes, and amides, and polymeric compounds of these structural types. It is also possible to use any desired mixtures of these monomers and/or polymers which comprise at least one group that is polymerizable on exposure to actinic radiation.

Compounds used of component C can comprise modified monomers or polymers, modified by methods known per se. The modification introduces appropriate chemical functionalities into the molecules. Suitable compounds are α,α-unsaturated carboxylic acid derivatives such as acrylates, methacrylates, maleinates, fumarates, maleimides, acrylamides, and also vinyl ethers, propenyl ethers, allyl ethers, and compounds comprising dicyclopentadienyl units. Preference is given to vinyl ethers, acrylates, and methacrylates, and particular preference is given to acrylates. Examples include the reactive diluents known in radiation-curing technology (cf. Römpp Lexikon Chemie [Römpp's Chemical Encyclopedia], p. 491, 10th edn., 1998, Georg-Thieme-Verlag, Stuttgart), or the binders known in radiation-curing technology, for example polyether acrylates, polyester acrylates, urethane acrylates, epoxy acrylates, melamine acrylates, silicone acrylates, polycarbonate acrylates, and acrylated polyacrylates.

Suitable esters are usually obtained via esterification of alcohols having from 2 to 20 carbon atoms, preferably polyhydric alcohols having from 2 to 20 carbon atoms, with unsaturated acids or unsaturated acyl chlorides, preferably acrylic acid and derivatives thereof. Esterification methods known to the person skilled in the art can be used for this purpose.

Suitable alcohol components in the esterification are monohydric alcohols such as the isomeric butanols, pentanols, hexanols, heptanols, octanols, nonanols, and decanols, and also cycloaliphatic alcohols such as isobornol, cyclohexanol, and alkylated cyclohexanols, dicyclopentanol, arylaliphatic alcohols such as phenoxyethanol and nonylphenylethanol, and also tetrahydrofurfuryl alcohols. Dihydric alcohols are likewise suitable, for example ethylene glycol, 1,2-propanediol, 1,3-propanediol, diethylene glycol, dipropylene glycol, the isomeric butanediols, neopentyl glycol, 1,6-hexanediol, 2-ethylhexanediol, 1,4-cyclohexanediol, 1,4-cyclohexanedimethanol, and tripropylene glycol. Suitable higher-functionality alcohols are glycerol, trimethylolpropane, ditrimethylolpropane, pentaerythritol, and dipentaerythritol. Preference is given to diols and higher-functionality alcohols, and particular preference is given to glycerol, trimethylolpropane, pentaerythritol, dipentaerythritol, and 1,4-cyclohexanedimethanol.

Suitable esters and urethanes are by way of example also accessible via reaction of unsaturated OH-functional, unsaturated compounds having from 2 to 12, preferably from 2 to 4, carbon atoms with acids, esters, anhydrides, or acyl chlorides and, respectively, with isocyanates.

Examples of hydroxy-functional acrylates or methacrylates that can be used are compounds such as 2-hydroxyethyl (meth)acrylate, polyethylene oxide mono(meth)acrylates, polypropylene oxide mono(meth)acrylates, polyalkylene oxide mono(meth)acrylates, poly(ε-caprolactone) mono (meth)acrylates, e.g. Tone® M100 (Dow, Schwalbach, Del.), 2-hydroxypropyl (meth)acrylate, 4-hydroxybutyl (meth)acrylate, 3-hydroxy-2,2-dimethylpropyl (meth)acrylate, the hydroxy-functional mono-, di-, or tetraacrylates of polyhydric alcohols such as trimethylolpropane, glycerol, pentaerythritol, dipentaerythritol, ethoxylated, propoxylated, or alkoxylated trimethylolpropane, glycerol, pentaerythritol, dipentaerythritol, or a technical mixture of these.

Examples of preferred unsaturated OH-functional compounds are hydroxyethyl (meth)acrylate, 2- and 3-hydroxypropyl (meth)acrylate, 2-, 3-, and 4-hydroxybutyl (meth) acrylate, and also OH-functional vinyl ethers, e.g. hydroxybutyl vinyl ether, and also mixtures of these.

Other OH-functional unsaturated compounds that can be used are OH-functional (meth)acrylates and—amides which are obtainable via reaction of up to n−1 equivalents of (meth)acrylic acid with n-functional alcohols, amines, amino alcohols, and/or a mixture of these. Examples of n-hydric alcohols that can be used here are glycerol, trimethylolpropane, and/or pentaerythritol.

It is likewise possible to use products from the reaction of epoxy-functional (meth)acrylates with (meth)acrylic acid. The reaction of glycidyl methacrylate with acrylic acid gives a mixed glycerol acrylate-methacrylate which can be used with particular advantage.

Urethanes can be produced from these OH-functional unsaturated compounds by using mono-, di-, or polyisocyanates. Compounds suitable for this purpose are isomeric butyl isocyanates, butylene diisocyanate, hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes, and mixtures thereof having any desired isomer content, isocyanotomethyloctane 1,8-diisocyanate, cyclohexylene 1,4-diisocyanate, the isomeric cyclohexanedimethylene diisocyanates, phenylene 1,4-diisocyanate, tolylene 2,4- and/or 2,6-diisocyanate, naphthylene 1,5-diisocyanate, diphenylmethane 2,4'- and 4,4'-diisocyanate, triphenylmethane 4,4',4"-triisocyanate, and derivatives of these with urethane structure, urea structure, carbodiimide structure, acylurea structure, isocyanurate structure, allophanate structure, biuret structure, oxadiazinetrione structure, uretdione structure, iminooxadiazinedione structure, and mixtures of same. Preference is given to polyisocyanates based on oligomerized and/or derivatized diisocyanates which have been freed from excess diisocyanate by suitable methods, in particular those of hexamethylene diisocyante, isophorone diisocyanate, and the isomeric bis(4,4'-isocyanatocyclohexyl)methanes, and mixtures of these. Preference is given to the oligomeric isocyanurates, uretdiones, allophanates, and iminooxadiazinediones of HDI, to the oligomeric isocyanurates, uretdiones, and allophanates of IPDI, and also to the oligomeric isocyanurates of the isomeric bis(4,4'-isocyanatocyclohexyl)methanes, and also mixtures of these.

By analogy with the above description, suitable polyesters, polycarbonates, or polyurethanes are accessible by way of example via reaction of unsaturated OH-functional compounds having from 2 to 12, preferably from 2 to 4, carbon atoms with by way of example acid-, ester-, or acyl-chloride-functional polyesters or polycarbonates, or with NCO-functional polyurethanes.

Other suitable compounds are reaction products of polyesters with acid numbers >5 and of glycidyl-functional (meth)acrylates (e.g. glycidyl methacrylate).

Preferred OH-functional unsaturated compounds for the construction of unsaturated polyesters, polycarbonates, and polyurethanes are hydroxyethyl acrylate and the isomeric hydroxypropyl acrylates. Particular preference is given to the reaction product of glycidyl methacrylate and acrylic acid.

Polyacrylates can be modified by radiation curing only after polymerization of the acrylate monomers and vinylaromatic monomers. This is achieved by way of functional groups which are inert to the conditions of production of the polyacrylates, and which are only then modified to give unsaturated radiation-curing groups. Groups suitable for this purpose are by way of example those listed below:

| Inert group | Modifier reagent | Radiation-curing group |
|---|---|---|
| Epoxy | Acrylic acid, dimeric acrylic acid | Acrylate |
| Acid | Glycidyl methacrylate | Methacrylate |
| Acid | Hydroxyalkyl acrylate | Acrylate |
| Alcohol | Maleic anhydride | Maleate |
| Alcohol | Acrylic acid, dimeric acrylic acid | Acrylate |
| Alcohol | Acrylic-functional isocyanate | Urethane acrylate |
| Isocyanate | Hydroxyalkyl acrylate | Urethane acrylate |
| Anhydride | Hydroxyalkyl acrylate | Acrylate |

Photoinitiators D are initiators which can be activated via actinic radiation and which initiate free-radical polymerization of the corresponding polymerizable groups. Photoinitiators are marketed compounds known per se, and a distinction is made here between unimolecular (type I) and bimolecular (type II) initiators. Examples of type I systems are aromatic ketone compounds, e.g. benzophenones in combination with tertiary amines, alkylbenzophenones, 4,4'-bis(dimethylamino)benzophenone (Michler's ketone), anthrone, and halogenated benzophenones, and mixtures of those mentioned. Other suitable compounds are type II initiators such as benzoin and its derivatives, benzil ketals, acylphosphine oxides such as 2,4,6-trimethylbenzoyl-diphenylphosphine oxide, bisacylophosphine oxides, phenylglyoxylates, camphorquinone, α aminoalkylphenones, α, α-dialkoxyacetophenones, and α-hydroxyalkylphenones. It can also be advantageous to use mixtures of these compounds. The type and concentration of photoinitiator have to be adapted in the manner known to the person skilled in the art in order to be appropriate to the radiation source used for curing. Further details are given by way of example in P. K. T. Oldring (ed.), Chemistry & Technology of UV & EB Formulations For Coatings, Inks & Paints, vol. 3, 1991, SITA Technology, London, pp. 61-328.

Component E can comprise additives or auxiliaries conventionally used in the technology of lacquers, of paints, of printing inks, of sealants, and of adhesives.

Examples of suitable additives are light stabilizers, such as UV absorbers and reversible free-radical scavengers (HALS), antioxidants, deaerators, antifoams, wetting agents, emulsifiers, slip additives, polymerization inhibitors, adhesion promoters, plasticizers, levelers, film-forming aids, rheology aids, such as thickeners and pseudoplastic materials known as "sag control agents" (SCA), flame retardants, corrosion inhibitors, waxes, siccatives, and biocides.

These and other suitable constituents are described in the textbook "Lackadditive" [Coatings additives] by Johan Bieleman, Wiley-VCH, Weinheim, N.Y., 1998, in D. Stoye and W. Freitag (eds), "Paints, Coatings and Solvents", Second, Completely Revised Edition, Wiley-VCH, Weinheim, N.Y., 1998, "14.9. Solvent Groups", pp. 327 to 373.

UV absorbers convert UV radiation into heat. Known UV absorbers are hydroxybenzophenones, benzotriazoles, cinnamic esters, and oxalanilides. Free-radical scavengers bind free-radicals formed as intermediates. Important free-radical scavengers are sterically hindered amines, known as HALS (Hindered Amine Light Stabilizers). For outdoor applications, the total content of UV absorbers and free-radical scavengers is preferably from 0.1 to 5 parts by weight, particularly preferably from 0.5 to 4 parts by weight, based on 100 parts by weight of the radiation-curable compounds. The use of light stabilizers, and the various types, are described by way of example in A. Valet, Lichtschutzmittel für Lacke, Vincentz Verlag, Hannover, 1996.

The lacquer formulation in the invention can be solvent-based, and examples of solvents of the invention are hydrocarbons, alcohols, ketones, and esters, for example toluene, xylene, isooctane, acetone, butanone, methyl isobutyl ketone, ethyl acetate, butyl acetate, tetrahydrofuran, N-methylpyrrolidone, dimethylacetamide, and dimethylformamide.

It is likewise advantageous to use a reactive diluent. Reactive diluents that can be used concomitantly are compounds which likewise (co)polymerize during radiation curing and are thus incorporated into the polymer network. Suitable reactive diluents, which comprise at least one, in particular two, bond(s) that can be activated by actinic radiation, are olefinically unsaturated monomers, preferably vinyl aliphatic monomers and acrylates, in particular acrylates, having at least one double bond amenable to free-radical polymerization, and preferably having at least two double bonds amenable to free-radical polymerization. Suitable reactive diluents are described in detail in Römpp Lexikon Lacke and Druckfarben [Römpp's encyclopedia of lacquers and printing inks], Georg Thieme Verlag, Stuttgart, N.Y., 1998 "Reaktivverdünner" [Reactive diluents], pages 491 and 492.

Examples that may be mentioned as reactive diluents are esters of acrylic acid or methacrylic acid, preferably of acrylic acid with mono- or polyhydric alcohols. Suitable alcohols are by way of example the isomeric butanols, pentanols, hexanols, heptanols, octanols, nonanols, and decanols, and also cycloaliphatic alcohols such as isobornol, cyclohexanol, and alkylated cyclohexanols, dicyclopentanol, arylaliphatic alcohols such as phenoxyethanol and nonylphenylethanol, and also tetrahydrofurfuryl alcohols. It is also possible to use alkoxylated derivatives of these alcohols. Examples of suitable dihydric alcohols are alcohols such as ethylene glycol, 1,2-propanediol, 1,3-propanediol, diethylene glycol, dipropylene glycol, the isomeric butanediols, neopentyl glycol, 1,6-hexanediol, 2-ethylhexaendiol, and tripropylene glycol, and also alkoxylated derivatives of these alcohols. Preferred dihydric alcohols are 1,6-hexanediol, dipropylene glycol, and tripropylene glycol. Suitable trihydric alcohols are glycerol, trimethylolpropane, and alkoxylated derivatives of these. Tetrahydric alcohols are pentaerythritol and its alkoxylated derivatives. A suitable hexahydric alcohol is dipentaerythritol or any of its alkoxylated derivatives. Particular preference is given to the alkoxylated derivatives of the di- to hexahydric alcohols mentioned.

Component F can comprise non-functional polymers and fillers for adjustment of mechanical and optical properties, e.g. pigments, dyes, and/or matting agents.

Polymeric additives that can be used are polymers such as polyacrylates, polycarbonates, polyurethanes, polyolefins, polyethers, polyesters, polyamides, and polyureas.

Fillers that can be used comprise mineral fillers, glass fibers, and/or metallic fillers of the type used in familiar formulations for what are known as metallic finishes.

Pigments can be selected from the group consisting of organic and inorganic, transparent and opaque, pigments that provide color and/or that provide special effects, or else that are electrically conductive. Suitable pigments and fillers are described by way of example in Lückert, Pigmente und Füllstofftabellen [Pigments and filler tables], Poppdruck, Langenhagen, 1994.

The form in which the compounds of component F are used can either be that of bulk material or else that of particles with average diameters in the range from 1 to 20 000 nanometers, preferably in the range from 1 to 500 nanometers, particularly preferably in the range from 2 to 200 nanometers.

A matt effect can be achieved by using particles, pigments, or fillers with average particle size 200 µm, preferably from 10 to 20 µm, very particularly preferably from 5 to 15 µm.

There can be a protective layer applied on the lacquer layer, e.g. a peelable film which prevents unintended hardening. This can be removed before or after the injection-molding process. The thickness can be by way of example from 10 to 150 µm, preferably from 20 to 100 µm. The protective layer can be composed by way of example of polyethylene, polypropylene, or polyester (e.g. polyethylene terephthalate). The protective layer can be removed before irradiation. However, it is also possible to carry out the irradiation through the protective layer; for this, the protective layer must be transparent in the irradiation wavelength range.

In one embodiment of the invention, the carrier film can be surface-pretreated, e.g. via corona surface treatment, flame treatment, surface fluorination, plasma treatment, or UV pretreatment.

In order to improve the adhesion of the lacquer layer on the carrier film, it is advantageous to carry out a surface treatment on the film, to use lacquer formulations comprising solvent, or to use isocyanate components and/or reactive diluents.

The lacquer layer can be produced via wet application, e.g. via spray-application, doctoring, use of a slot coater, or use of rollers, and subsequent drying and/or partial thermal curing and, after the insert-molding process, via completion of curing by UV radiation, or via extrusion or coextrusion (for, by way of example, powder-coating systems), corresponding to a partial curing process, and passed onward for completion of curing by UV after insert molding.

The expression "partial thermal curing by means of a polyaddition reaction" means a polymerization reaction in which multiple repeats of addition reactions of di- or polyfunctional monomers form a polymeric product, where the addition reaction proceeds without elimination of any lower-molecular-weight compound (see Elias, Makromoleküle [Macromolecules], 5th edn. vol, 1, pp, 220 ff., Hüthig and Wepf, Basle, 1990). Examples of polyaddition reactions are the formations of polyureas and polyurethanes, and the reactions of epoxy resins with di- or polyamines. Preference is given in the invention to partial curing via formation of polyurethanes from isocyanates A and isocyanate-reactive components B as described above. Because of the defined functionality of components A and B of the coating composition, the product here is a blocking-resistant coating with thermoplastic properties.

The description blocking-resistant is used for a coating which exhibits no tendency toward adhesive bonding to itself (see Zorll (ed.), Römpp Lexikon Lacke and Druckfarben [Römpp's encyclopedia of lacquers and printing inks], 10th edn. p. 81, Georg Thieme Verlag, Stuttgart, 1998).

To the extent that crosslinking agents are also present, where these bring about additional thermal crosslinking, examples being isocyanates, it is possible by way of example that, simultaneously with the radiation curing, thermal crosslinking is carried out via temperature increase to up to 150° C., preferably up to 130° C.

The drying and hardening of the lacquer layer intended for partial thermal curing generally takes place under normal temperature conditions, i.e. room temperature, without heating of the lacquer layer in the case of two-components systems which begin to react on mixing, but preferably takes place at elevated temperature, this being in principle necessary in the case of blocked/protected isocyanates. The expression "elevated temperature" in the invention means by way of example from 40 to 250° C., preferably from 40 to 150° C., and in particular from 40 to 130° C., and temperatures used for blocked/protected isocyanates are from 120° C. to 160° C., preferably from 130 to 140° C. These values are subject to limits, and are determined via the thermal stability of the carrier.

Once the lacquer, curing of which can be completed by UV, has been subjected to the first partial thermal curing step on the carrier layer, the resultant lacquer-coated film can optionally be rolled up, without any adhesive bonding of the coating to the reverse side of the substrate film. However, it is also possible to cut the lacquer-coated film to size and to pass the segments onward to further processing, individually or in the form of stack.

It is preferable that the lacquer layer of the invention is produced from a lacquer formulation which comprises at least one binder that can be cured via actinic radiation. Suitable binders are UV-curable polyurethane dispersions, UV-curable polyacrylate dispersions, and mixtures of these, and with UV-reactive monomers; UV-curable polyurethane (meth)acrylate dispersions are moreover suitable.

Suitable commercially available binders are obtainable by way of example as Lux® from Alberdingk & Boley GmbH, Krefeld, Del., in particular Lux 1613, 241, 285, 331, 460, 480; and also Laromer® from BASF AG, Ludwigshafen, Del., in particular LR 8949, 8983, 9005; and also Bayhydrol® UV from Bayer MaterialScience AG, Leverkusen, Del., in particular Bayhydrol® UV 2282, VP LS 2317, VP LS 2280 and XP 2629; and also Ucecoat® from Cytec Surface Specialities SA/NV, Brussels, BE, in particular Ucecoat® 7571, 7770, 7772, 7773, 7825 and 7849.

The production of suitable urethane (meth)acrylates with high glass transition temperatures is described in detail and by way of example in the patent applications EP A 1 448 735 and EP A 1 541 649. EP A 1 448 735 describes the production of urethane (meth)acrylates with suitable glass transition temperatures and with low melt viscosities, and use of these in powder coatings. These products can by way of example be used after dissolution in organic solvents. Other urethane (meth)acrylates are described in WO 2005/080484, WO 2005/099943, WO 2005/118689, WO 2006/048109.

Suitable polyester (meth)acrylates are known. Suitable materials are in particular binders obtainable in the form of powder coating, these being dissolved in organic solvents, examples being Uvecoat® 2300 and 3003 from Cytec Surface Specialities BV/NV, Brussels, BE. Suitable (meth)acrylated polymers of vinylic monomers are likewise known, an example being Ebecryl® 1200 from Cytec Surface Specialities BV/NV, Brussels, BE. Examples of suitable constituents of appropriate binders are urethane (meth)acrylates, polyester (meth)acrylates, epoxy (meth)acrylates, and (meth)acrylate polymers such as polyacrylates. Preference is given to urethane (meth)acrylates.

Examples of suitable binders and lacquers resulting therefrom are known to the person skilled in the art and are described by way of example in WO 2008/052665 A2.

The lacquer layer can moreover comprise inorganic nanoparticles, in particular oxides, mixed oxides, hydroxides, sulfates, carbonates, carbides, borides, or nitrides of the elements of main groups II to IV of the Periodic Table of the Elements, or of elements of transition groups I to VIII, inclusive of the lanthanoids. Preferred inorganic nanoparticles are oxides of silicon, of aluminum, of cerium, of zirconium, of niobium, of zinc, or of titanium, particularly preferably oxides of silicon and of titanium.

The average diameter of the nanoparticles is preferably less than 200 nm, preferably less than 5 to 100 nm (measured by dynamic light scattering in dispersion as Z-average). The proportion of the nanoparticles with the size described immediately above is preferably more than 75%, still more preferably 90%.

The expression "completion of curing by UV radiation, using actinic (UV) radiation" means the free-radical polymerization of ethylenically unsaturated carbon-carbon double bonds by means of initiator free radicals which are liberated via irradiation with actinic radiation by way of example from the photoinitiators described above.

After the insert-molding process with a thermoplastic as main element, the partially thermally cured lacquer layer which has undergone a thermal forming process on the film is subjected to completion of curing via irradiation with actinic radiation. The radiation curing is preferably achieved via exposure to high-energy radiation, i.e. UV radiation or daylight, e.g. light of wavelength from 200 to 750 nm, or via irradiation with high-energy electrons (electron beam, from 90 to 300 keV). Examples of radiation sources used for light or UV light are medium- and high-pressure mercury vapor lamps, where the mercury vapor can have been modified via doping with other elements such as gallium or iron. It is likewise possible to use lasers, pulsed lamps (known as UV flash sources), halogen lamps, or excimer sources. The sources can be fixed installations, and in that case the product to be irradiated is moved past the radiation source by means of a mechanical device, or the sources can be movable; in this case the location of the product to be irradiated does not alter during the completion-of-curing process. The radiation dose that is usually sufficient for crosslinking in UV curing is in the range from 80 to 5000 ml/cm$^2$.

The irradiation can also optionally be carried out with exclusion of oxygen, e.g. under inert gas or in an oxygen-depleted atmosphere. Suitable inert gases are preferably nitrogen, carbon dioxide, noble gases, or combustion gases. In another possible irradiation method, the coating is covered with media that are transparent to the radiation. Examples here are lamination films such as plastics films, glass, or liquids such as water.

The type and concentration of the initiator optionally used depend on radiation dose and on conditions used for completion of curing, and require variation or optimization in the manner known to the person skilled in the art, or via use of preliminary experiments for guidance purposes. In a particularly advantageous method for the curing of the films that have undergone the forming process, curing is carried out by use of a plurality of sources, the arrangement of which requires selection in such a way that every point on the coating receives as nearly as possible the ideal dose and intensity of radiation required for the curing process. In particular, unirradiated regions (shadow zones) are to be avoided.

It is particularly preferable to use, for the completion-of-curing process, mercury sources with a power rating of 120 W/cm in fixed installations, where the molding requiring completion of curing is moved past the source. Photoinitiators are then used in concentrations of from 0.1 to 10% by weight, particularly preferably from 0.2 to 3.0% by weight, based on the solids of the lacquer layer. The dose used for the curing of these coatings is preferably from 500 to 4000 mJ/cm$^2$, or from 500 to 5000 mJ/cm$^2$, preferably from 1000 to 3000 mJ/cm$^2$, particularly preferably 1500 mJ/cm$^2$, measured in the wavelength range from 200 to 600 nm.

During the completion-of-curing process using UV, an elevated ambient temperature can arise, caused by the UV sources, and therefore in one embodiment of the invention the completion-of-curing process using UV can take place at temperatures of from 60° C. to 100° C., preferably from 70° C. to 90° C., particularly preferably 80° C.

The invention likewise provides the use of the moldings of the invention in the external region of buildings, as exterior and interior motor-vehicle parts, e.g. wheel surrounds, door cladding, bumpers, spoilers, aprons, and also external mirrors, as control panels for vehicle (interior) construction, rail vehicle (interior) construction, construction of (interiors of) ships, and/or construction of (interiors of) aircraft, in furniture construction, in electronic devices, in communications devices, in housings, or in decorative articles.

Numerous embodiments of the invention are possible. For further explanation of the principle underlying the invention, one of these embodiments is depicted in a drawing, and is described below.

EXAMPLES

The invention is illustrated with reference to examples below, without any restriction to same.

Figure 3:
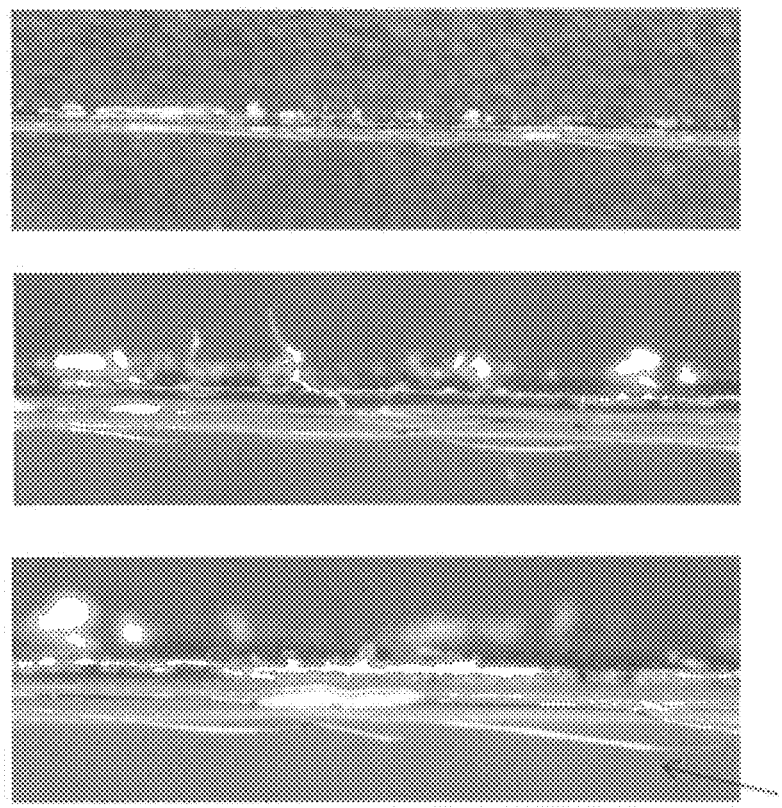
Figure 3:
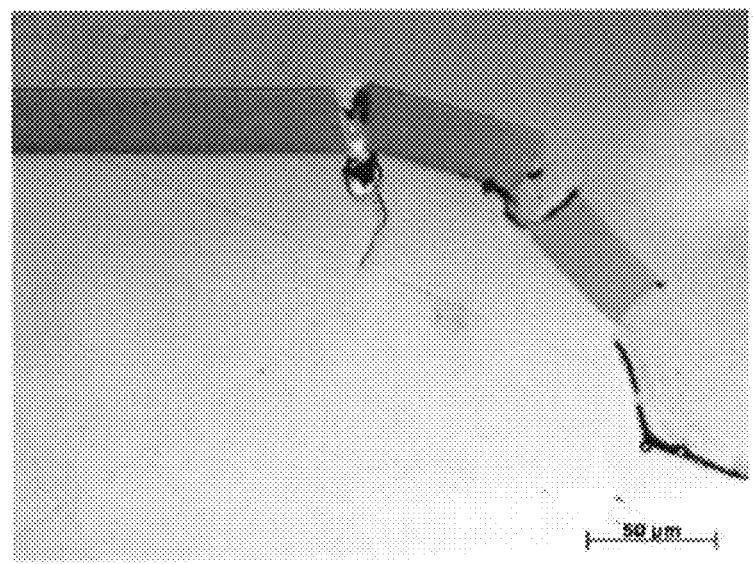
Figure 4:
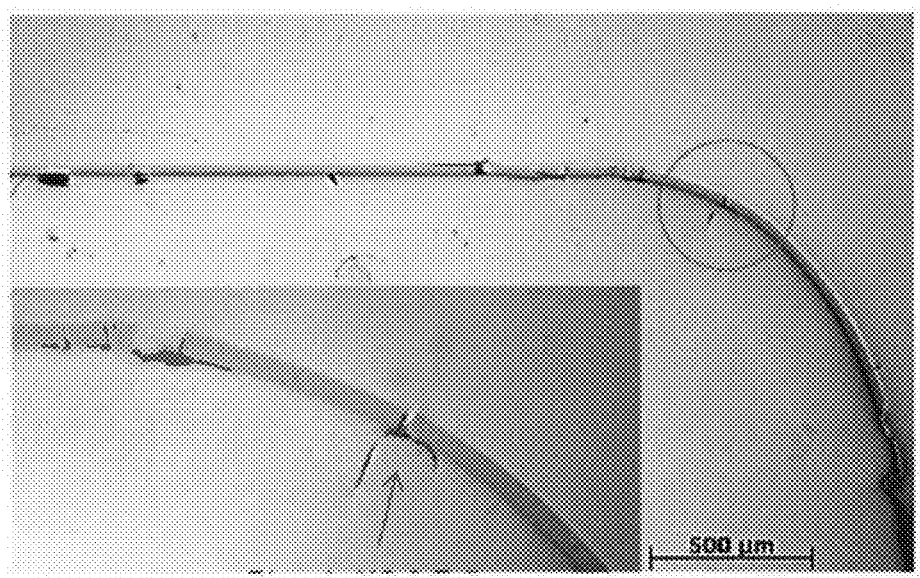
Figure 4:
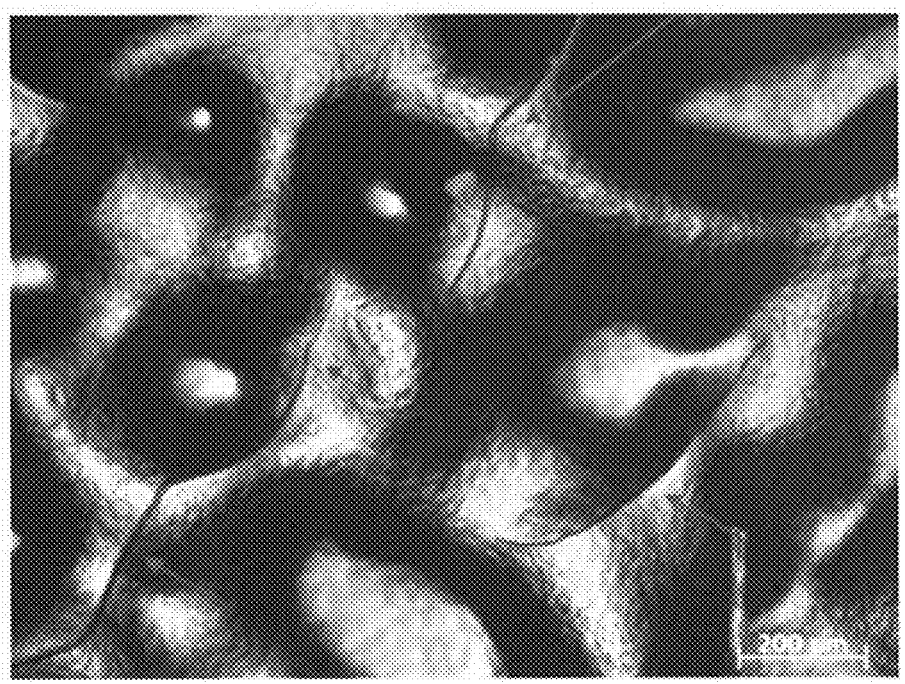
Figure 5:
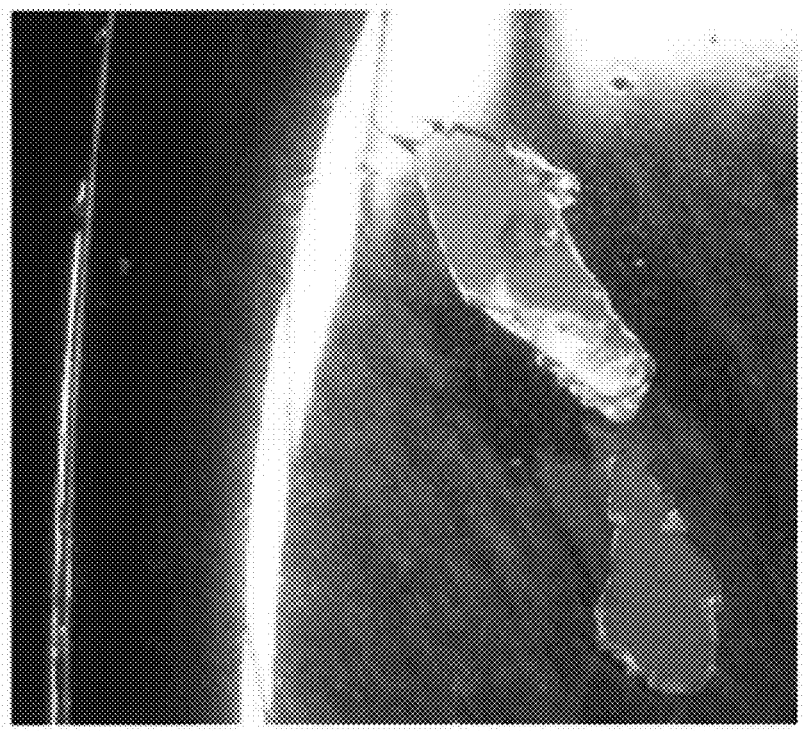
Figure 5:
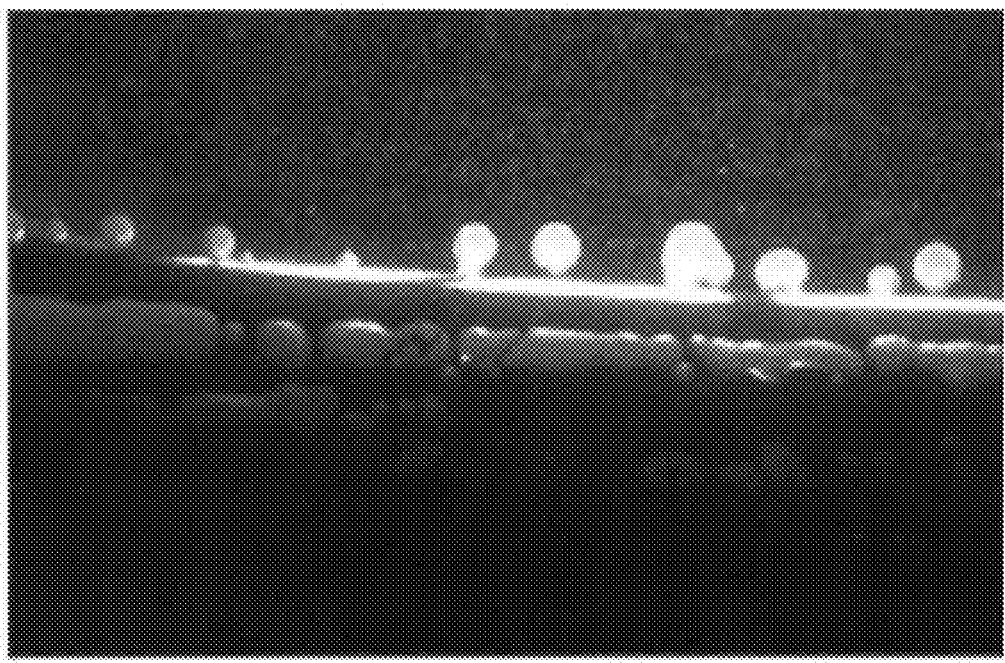
Figure 6:
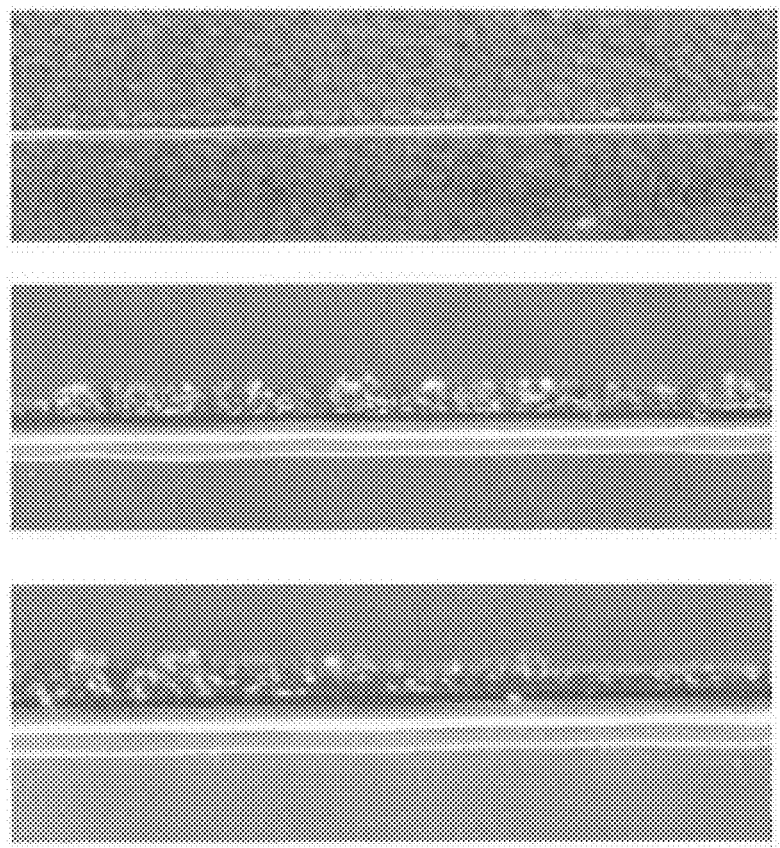
Figure 7:
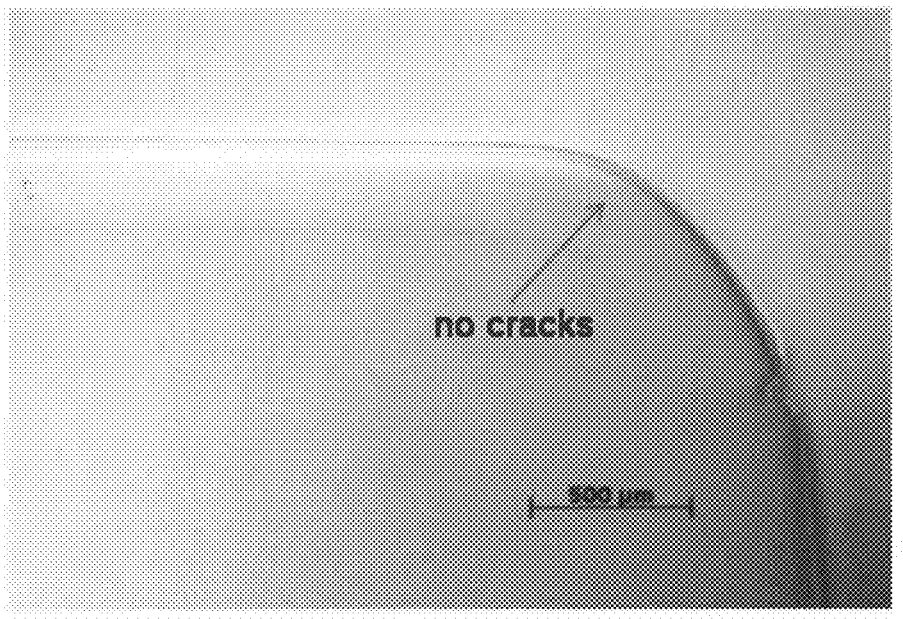
Figure 7:
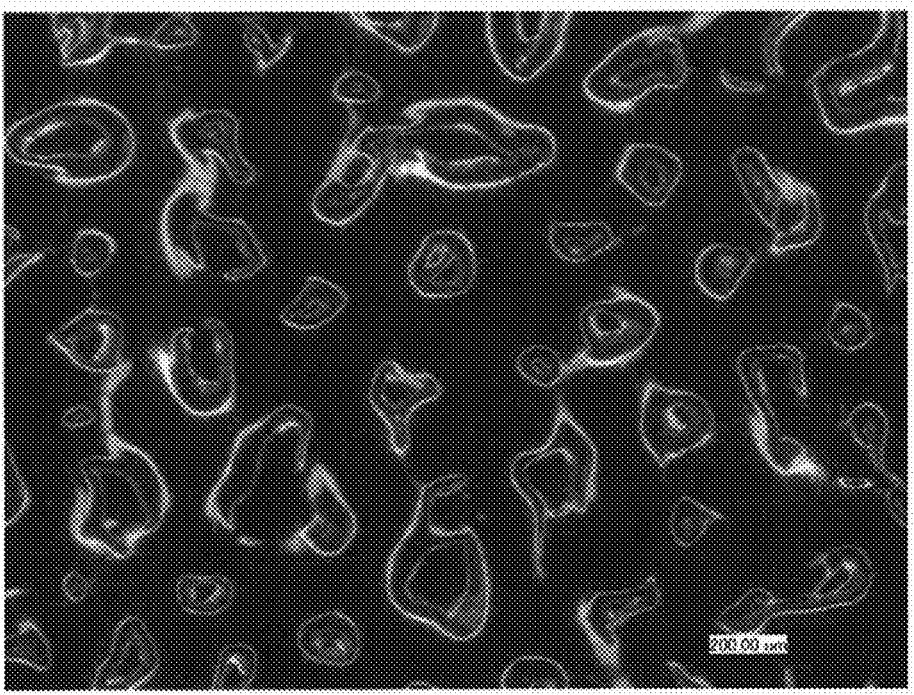
Figure 7:
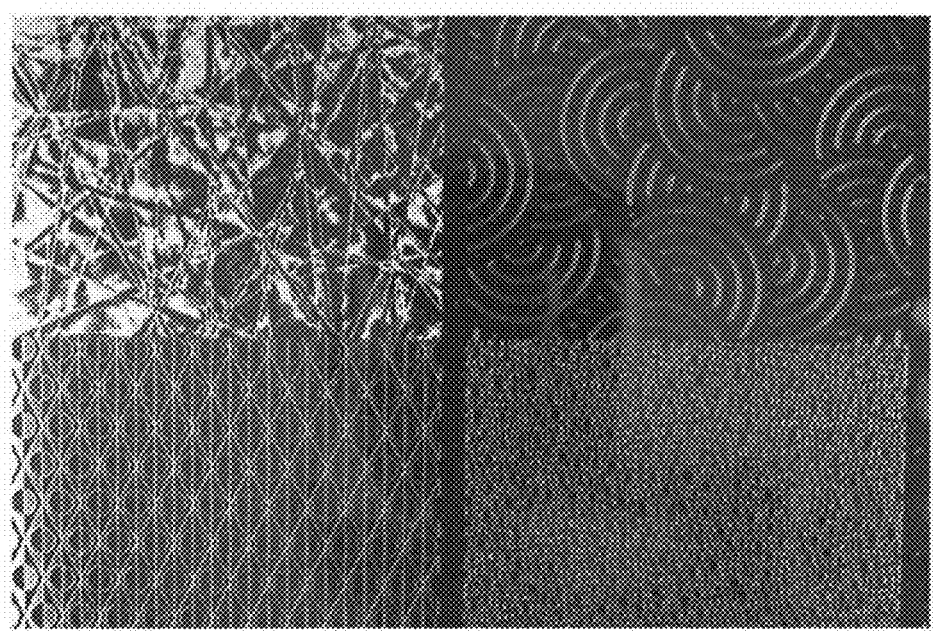

FIG. 3a) shows cracking and fragmentation in comparative film A after the cutting-to-size/punching process, at 50×, 150×, and 200× magnification;

b) shows visible cracking in the profile of comparative film A after the cutting-to-size/punching process;

FIG. 4 shows a comparative molding A with comparative film A with the following results of insert molding: a) lacquer layer that has undergone the forming process, and small-radius region of the film with cracking, and b) finely structured surface of the lacquer layer with microcracking;

FIG. 5 shows a comparative molding B with comparative film B with visible a) lacquer separation and b) blistering;

FIG. 6 shows a film of the invention after the cutting-to-size/punching process at 50×, 150×, and 200× magnification;

FIG. 7 shows a molding of the invention with the following results of insert molding: a) lacquer layer that has undergone the forming process with no cracking, and small-radius region of film, b) finely structured surface with no cracking, and c) variously designed surfaces with no cracking, no blistering, and no separation.

1. COMPARATIVE EXAMPLE

Production of a comparative molding A with comparative film A provided with hardened lacquer layer An optionally reverse-side-printed film made of polycarbonate with layer thickness 280 μm and with a hardened lacquer layer based on UV-cured aliphatic urethane acrylate coating in principle corresponding to the disclosure in DE 102010020039A1 was cut to size on a cutting plotter and prepared as 2 D insert. Cracking occurs here at the edge of the film, and separation/fragmentation occurs here in the precured lacquer layer (see FIGS. 3a) and b)).

Figure 1:
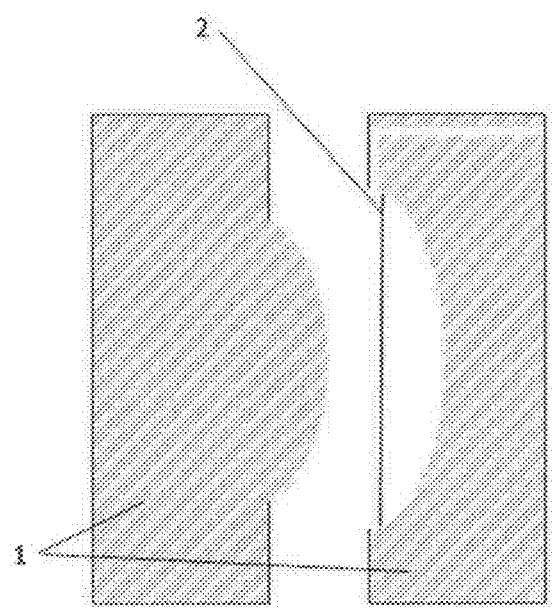
FIG. 1 shows a side view of a mold with inserted film.
Figure 2:
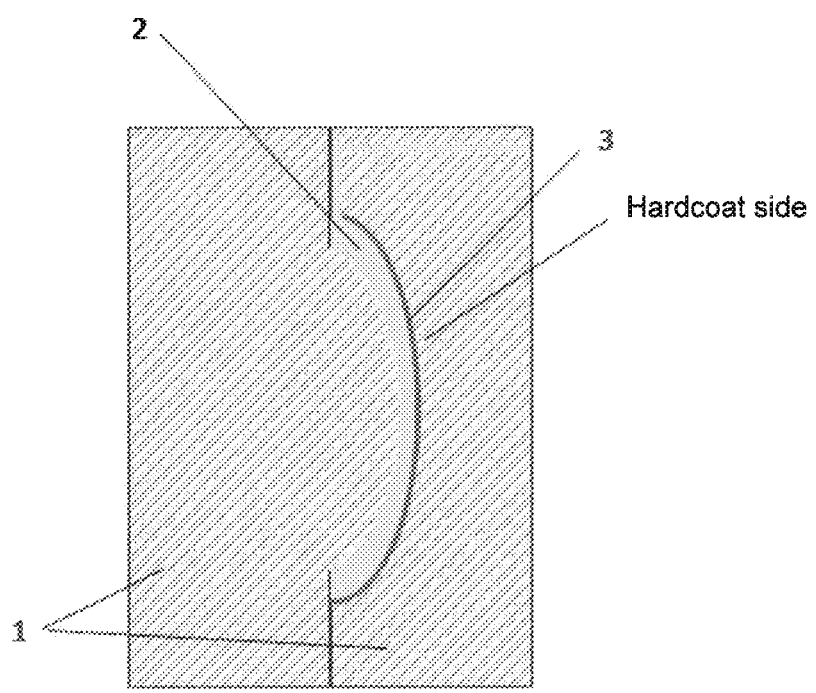
FIG. 2 shows a side view of a mold during the insert-molding procedure.

The film (2), with the lacquer layer, was inserted in the direction of the female mold cavity of the mold (1) for a heating/ventilation panel in an Arburg injection-molding machine, and to some extent pressed manually onto existing cores (FIG. 1). The orientation of the lacquer layer here is toward the external side, and it therefore subsequently represents the visible side of the molding. The mold was then closed, and the film was insert molded with the hot melt (3) (FIG. 2). The locking force here was 200 t, and the screw diameter was 45 mm. The injection time was 2 s. Makrolon 2205 from Bayer MaterialScience AG, Leverkusen, Del., was used as insert-molding material, in the color 901510 (black). Melt temperature was 280° C. and mold temperature was 60° C. As a result of the injection procedure, the temperature and the injection pressure, the film was then converted to its actual shape. A bond was formed here between the film, or the insert, and the thermoplastic material. After cooling, the mold was opened and the molding was removed. The extent of protective covering, and protection, of the small-radius regions of the component by the coated film was partial: about ⅓. Cracking in the lacquer layer, extending into the carrier layer, is discernible in the small-radius regions in the micrograph (FIG. 4a)). Even when machine parameters such as melting temperature and mold temperature were varied, no good results were obtained, i.e. when comparative film A with hardened lacquer layer is used, it is not possible to avoid cracking by alterations to the conduct of the process.

An attempt was made to form a grained, finely structured functional area as visible area, by using a grained female mold. When the hardened comparative film A is inserted into a grained mold and subjected to insert molding it is impossible to obtain surface embossment without cracking (microcracks) (FIG. 4b)).

2. COMPARATIVE EXAMPLE

Production of a comparative molding B with comparative film B provided with a thermally dried lacquer layer.

An optionally reverse-side-printed film made of polycarbonate with layer thickness 280 μm and with a thermally dried lacquer layer made of a UV-curing acrylate dispersion was cut-to-size and subjected to insert molding as described in example 1.

During the cutting-to-size/punching process, no cracking appeared at the cut edges, and once the insert-molded molding was removed from the mold it was apparent that some separation of the lacquer layer had occurred, and that the some regions of the lacquer layer had blisters (FIGS. 5a) and b)).

3. INVENTIVE EXAMPLE

Production of a molding of the invention with film of the invention provided with a partially thermally cured UV lacquer layer, curing of which can be completed by UV.

An optionally reverse-side-printed film obtainable from Bayer MaterialScience AG, Leverkusen, Makrofol® HF 329 G-4 020011, made of polycarbonate, with layer thickness 280 μm, with a partially thermally cured lacquer layer, curing of which can be completed by UV, made of a solvent-containing UV-curable binder with additional polyisocyanate crosslinking agent, was cut to size and subjected to insert molding as described in example 1.

During cutting-to-size/punching no cracking appeared at the cut edges (FIG. 6), and once the insert-molded molding of the invention was removed, the component was hardened in a UV system from SSR equipped with a high-pressure mercury lamp. The curing conditions were: UV radiation dose: 2000 mJ/cm$^2$, belt speed: 3 m/min, distance of lamp from component about 100 mm.

The microtome revealed no cracking in the small-radius region of the lacquer layer (FIG. 7a)).

When this film, equipped with partially thermally cured lacquer layer, curing of which can be completed by UV, is inserted into a grain mold and subjected to insert molding, it is indeed possible to achieve a fine surface embossment. Even when surface structuring of various types, with different levels of complexity, was produced in the lacquer layer, no cracking (microcracks) or blistering or lacquer separation was observed (FIGS. 7b) and c)).

Surprisingly, insert molding was possible without damage to the lacquer layer even at high melt/mold temperatures. Nor were any adverse effects apparent when the machine parameters were altered: examples being melt temperature 280 to 310° C. and mold temperature from 50 to 110° C. It is known that films that have not been precured cannot be subjected to insert molding, because separation of the coating, or blistering can occur to some extent as in comparative example 2. No such effect was observable in the case of the molding of the invention.

Nor was there any adverse effect observable in the "injection-compression molding" injection-molding process in which the mold initially has a gap which is then closed during or after injection molding, thus avoiding color leaching through the injection-molding composition as it enters.

What is claimed is:

1. A process for production, in an injection mold, of a plastics molding with a UV-cured lacquer and with a visible area designed as functional area, where the UV-cured lacquer forms said visible area, comprising arranging a film segment that has not been preformed and that is in essence flat, composed of a carrier layer made of a thermoplastic and of a partially thermally cured UV-curable lacquer in a cavity of the injection mold in such a way that the partially cured lacquer layer faces toward a female-mold surface replicating the negative form of the visible area of the molding, and subjecting the film segment arranged in the cavity to insert molding with a thermoplastic on a reverse-side surface facing away from the partially thermally cured UV-curable lacquer, in such a way that the carrier layer of the film segment bonds to the injected hot melt, and wherein a compressive force resulting from the injection pressure of the injected melt acts in the direction of the female-mold surface, whereupon, with exposure to the compressive force and to heating resulting from the direct contact with the hot melt, the entire area of the film segment is forced onto the female-mold surface and subjected to a three-dimensional forming process, removing of the molding, and curing the partially thermally cured UV-curable lacquer to completion by UV radiation and, on the molding, forming the visible area designed as functional area.

2. The process as claimed in claim 1, wherein, before and/or during and/or after the production of the molding, at least a region delimiting the cavity within the injection mold is subjected to temperature control.

3. The process as claimed in claim 1, wherein, in the region of an injection aperture of the injection mold, the film segment is fixed in such a way that the compressive force resulting from the injection pressure of the injected melt acts toward a reverse-side surface facing away from the lacquer layer on the film segment.

4. The process as claimed in claim 1, wherein the thermoplastic injected is loaded with a blowing agent.

5. The process as claimed claim 1, wherein, before the film segment is subjected to insert molding, a color is applied at least on a section of a reverse-side surface facing away from the lacquer layer of the film segment.

6. The process as claimed in claim 1, wherein at least one functional element is injection-molded onto the molding.

7. The process as claimed in claim 1, wherein the molding is produced by subjecting the film segment to insert molding in the single- or multicomponent injection-molding process.

* * * * *